US006867412B2

(12) United States Patent
Patzwald et al.

(10) Patent No.: US 6,867,412 B2
(45) Date of Patent: Mar. 15, 2005

(54) SCALE STRUCTURES AND METHODS USABLE IN AN ABSOLUTE POSITION TRANSDUCER

(75) Inventors: Andrew M. Patzwald, Kirkland, WA (US); Kim W. Atherton, Kirkland, WA (US)

(73) Assignee: Mitutoyo Corporation, Kawasaki (JP)

( * ) Notice: Subject to any disclaimer, the term of this patent is extended or adjusted under 35 U.S.C. 154(b) by 297 days.

(21) Appl. No.: 10/293,784

(22) Filed: Nov. 12, 2002

(65) Prior Publication Data

US 2004/0089796 A1 May 13, 2004

(51) Int. Cl.[7] ............................................... G01D 5/34
(52) U.S. Cl. ...................... 250/231.13; 341/9; 356/617
(58) Field of Search ...................... 250/231.1, 555–557, 250/559.29, 566, 570, 559.44, 231.13–231.18, 237 R; 341/9, 13; 356/615–617

(56) References Cited

U.S. PATENT DOCUMENTS

| 3,882,482 | A | | 5/1975 | Green et al. |
| 4,106,481 | A | | 8/1978 | van Kuijk |
| 4,519,140 | A | * | 5/1985 | Schmitt ........................ 33/706 |
| 4,631,519 | A | | 12/1986 | Johnston |
| 4,717,824 | A | * | 1/1988 | Sakamoto et al. ...... 250/237 G |
| 5,235,181 | A | * | 8/1993 | Durana et al. ......... 250/231.18 |
| 5,279,044 | A | | 1/1994 | Bremer |
| 5,825,307 | A | * | 10/1998 | Titus et al. .................... 341/13 |
| 5,886,519 | A | | 3/1999 | Masreliez et al. |
| 5,965,879 | A | | 10/1999 | Leviton |

FOREIGN PATENT DOCUMENTS

JP          05-172586      *  9/1993

* cited by examiner

*Primary Examiner*—Thanh X. Luu
*Assistant Examiner*—Stephen Yam
(74) *Attorney, Agent, or Firm*—Christensen O'Connor Johnson Kindness PLLC

(57) ABSTRACT

An absolute position-sensing device is usable to measure the relative position of two elements. An absolute scale includes an integrated track extending along a measuring axis of the scale. The integrated track includes a plurality of code portions interleaved with, or embedded in, a plurality of periodic portions. Each periodic portion includes a plurality of periodically-placed incremental scale elements. Each code portion includes a plurality of code elements indicative of an absolute measurement value. The code elements are arranged in code element zones along the direction perpendicular to the motion axis, and are detectable by associated variations along the direction perpendicular to the motion axis. The offset of the periodically placed elements relative to a readhead of the device is combined with the absolute measurement value to determine an absolute position.

20 Claims, 12 Drawing Sheets

SCALE STRUCTURES AND METHODS USABLE IN AN ABSOLUTE POSITION TRANSDUCER

FIELD OF THE INVENTION

This invention relates to an absolute position optical displacement-sensing device.

BACKGROUND OF THE INVENTION

Absolute position encoders use a scale structure that allows the position of a readhead relative to a scale to be determined without requiring any reference to a given starting point along the scale. A variety of absolute position encoders are known which use multiple information tracks along the scale.

In many conventional capacitive and inductive absolute position encoders, the scale structures include two or more tracks that have different periodic spatial wavelengths that, in combination, uniquely identify the position of the readhead relative to the scale within a limited distance. U.S. Pat. No. 5,886,519 discloses one embodiment of such an inductive absolute position encoder.

The '519 patent also discloses an embodiment that includes a track having a periodic spatial layout of the sensible elements and a separate, code, track that includes a series of sensible elements that are arranged in a pseudo-random sequence. In particular, for any subset of the sensible elements of this code track that are located within the bounds of the readhead sensor elements, the sensible elements form a unique binary, trinary or higher-modulus code word that uniquely identifies the position of the readhead relative to the scale to a first resolution, while the track having a periodic spatial layout identifies the position of the readhead relative to the scale to a finer resolution.

Similarly, many conventional optical position encoders use multiple information tracks along the scale, where, for each "position" along the scale, a code track, or a combination of code tracks, defines a unique value that uniquely identifies that position along the scale. Often, methods are also used which determine the position of a periodic track relative to the readhead to a resolution that is smaller than the resolution provided by the one or more code tracks alone. U.S. Pat. Nos. 3,882,482, 5,965,879 and 5,279,044, incorporated herein by reference, disclose such multi-code-track optical encoders.

U.S. Pat. No. 4,631,519, as well as the '044 patent, disclose embodiments of optical absolute position encoders that integrate the previously mentioned code track functions and periodic track functions into parallel tracks or a single combined track. In such embodiments, the sensible code elements are arranged in a pseudo-random sequence along a track, with each individual sensible code element positioned to align with a continuous periodic pitch of an incremental track such that a displacement of a pick-up device over one pitch of the incremental track always produces a specific code for each pitch.

SUMMARY OF THE INVENTION

The inventors of this invention have determined that the optical encoder configurations discussed above have a number of disadvantages. Multiple track disadvantages include requiring overly-large-sized readheads, overly-wide scales and poor "information density" in at least some of the tracks. Conversely, if multiple track configurations are made narrow, sensitivity to static and/or dynamic mounting misalignments and/or the need for more complicated readhead sensing or signal processing arises. Previous combined track optical encoder configurations also have a number of disadvantages. These disadvantages include limited absolute scale lengths if high resolution is desired, relatively low resolution if a long absolute scale length is desired, and/or the need for relatively more complicated readhead sensing or signal processing to achieve speeds, accuracies and resolution comparable to that achievable using a track of elements arranged periodically. Furthermore, it is relatively expensive to fabricate scales having code element sequences that are unique everywhere along the scale but which must nevertheless be precisely aligned with an underlying continuous periodic grid in order to provide accurate and high-resolution absolute measurements.

Furthermore, it should be appreciated that motion control system speeds are continually increasing, and none of the optical encoder configurations discussed above has adequately considered problems associated with the "smeared" code track images that result during high speed motion. Such code smearing problems at high speed are compounded when an absolute scale must provide both high resolution and a long absolute measuring range. An optical absolute position encoder that could avoid any one or more of the foregoing disadvantages would be useful.

This invention provides optical absolute position encoders that have relatively narrow scale widths and/or relatively small readhead detector sizes for a given resolution and absolute range.

This invention further provides optical absolute position encoders that reduce the size of the readhead and/or the width of the scale by using an integrated scale track that integrates both periodic and code structures.

This invention separately provides optical absolute position encoders that are relatively insensitive to static and dynamic misalignments of the scale in a direction transverse to the measuring axis.

This invention separately provides optical absolute position encoders that have both long scale lengths and high resolution.

This invention further provides optical absolute position encoders that obtain long scale lengths and high resolution by using an integrated scale track that includes a code portion that allows for long scale lengths and a periodic portion that allows for high-resolution determinations of the relative position between the readhead and the scale.

This invention separately provides optical absolute position encoders that have both high resolution and reliable operation at high speeds.

This invention further provides optical absolute position encoders that have high resolution, reliable operation at high speeds and long absolute scale lengths.

This invention separately provides a scale for optical absolute position encoders that has an integrated scale track that includes both a code portion and a periodic portion.

This invention further provides a scale that has an integrated scale track where the code portion is embedded in the periodic portions.

This invention further provides a scale that has an integrated scale track where the code portion and the periodic portion occur alternately along the length of the scale.

This invention additionally provides a scale track where the code portions and the periodic portions that occur alternately along the scale are adjacent to one another.

This invention separately provides methods for determining the absolute position of a readhead of an optical absolute position encoder relative to a scale of the optical absolute position encoder from an image of an integrated scale track that includes both code portions and periodic portions.

This invention further provides methods for determining the absolute position of the readhead relative to the scale by locating a code portion appearing within an image of the scale and determining a first-resolution relative position based on the code appearing in the located code portion.

This invention further provides methods for determining the code appearing within an image of the scale by scanning along a direction transverse to the measuring axis.

This invention additionally provides methods for determining the absolute position of the readhead relative to the scale by locating a local datum characteristic appearing within the image of the scale and determining a second-resolution relative position based on the location of the local datum characteristic within the image of the scale.

This invention also provides methods for determining the absolute position of the readhead relative to the scale by determining an offset distance between a periodic portion appearing within the image and a periodic reference structure and determining a third-resolution relative position based on the offset distance.

In various exemplary embodiments of the scale according to this invention, the scale includes an integrated scale track extending along a measuring axis. The integrated scale track includes one or more coded segments placed along the measuring axis. The coded segments include one or more periodic portions placed along the measuring axis, where each periodic portion has a plurality of periodically placed incremental scale elements. The coded segments of the integrated scale track also include code portions, which are located within or between the periodic portions. Each code portion is a unique set or group of code elements and thus identifies a specific location along the scale. In various exemplary embodiments, the code elements are arranged along a direction transverse to the measuring axis.

In various exemplary embodiments, each code portion includes a predetermined portion. The predetermined portion may be a single element or space having predetermined characteristics, or a predetermined pattern of elements. In various other exemplary embodiments, a predetermined portion that is associated with the code portions is provided on the scale adjacent to each code portion in a consistent spatial relationship relative to each code portion. In any case, this predetermined portion allows the readhead signals arising from the code portions of the scale to be rapidly distinguished from the readhead signals arising from other portions of the scale.

In various other exemplary embodiments according to this invention, the periodic incremental scale elements are placed along the scale to coincide with an underlying incremental pitch that is continuous and spatially synchronized between the periodic portions, even though the code portions and/or spaces may interrupt the continuity of the periodically placed incremental scale elements along the measuring axis. In various other exemplary embodiments according to this invention, the code portion of one coded segment may be spaced apart from the code portion of an adjacent coded segment up to a determined limit based on the dimensions of a detector array of the readhead and a magnification applied to the scale image by the readhead.

In various other exemplary embodiments according to this invention, at least some of the individual code elements of the code portions are narrower in a direction perpendicular to the measuring axis than a dimension of at least some of the incremental scale elements along the measuring axis.

In various exemplary embodiments, the code elements of each coded segment indicate the position or measurement value of a local datum to provide a coarse resolution absolute position value. The local datum is associated with a plurality of periodically placed incremental scale elements. In various other exemplary embodiments according to this invention, a detector array of the readhead further determines the position of a local datum characteristic relative to the detector array to a higher resolution that is finer than the period of the periodically placed incremental scale elements. In various other exemplary embodiments according to this invention, the detector array of the readhead further determines the position of at least some of the periodically placed incremental scale elements relative to the detector array and/or the readhead to provide the highest resolution absolute position measurement.

In various other exemplary embodiments according to this invention, the detector array pitch is chosen in a first direction corresponding to the measuring axis direction such that there are a plurality of detector elements for each periodic scale element imaged by the array. In various exemplary embodiments, the detector array pitch is chosen in a second direction corresponding to the direction perpendicular to the measuring axis direction such that there is a plurality of detector elements for each code element imaged by the array.

In various exemplary embodiments of the absolute scale according to this invention, the code elements in each coded segment form sequential code words along the scale. In various other exemplary embodiments according to this invention, the sequential code words directly indicate the corresponding position along the scale. In various other exemplary embodiments according to this invention, the sequential code words are converted to absolute position measurement values using a decoder look-up table.

These and other features and advantages of this invention are described in, or are apparent from, the following detailed description of various exemplary embodiments of the systems and methods according to this invention.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
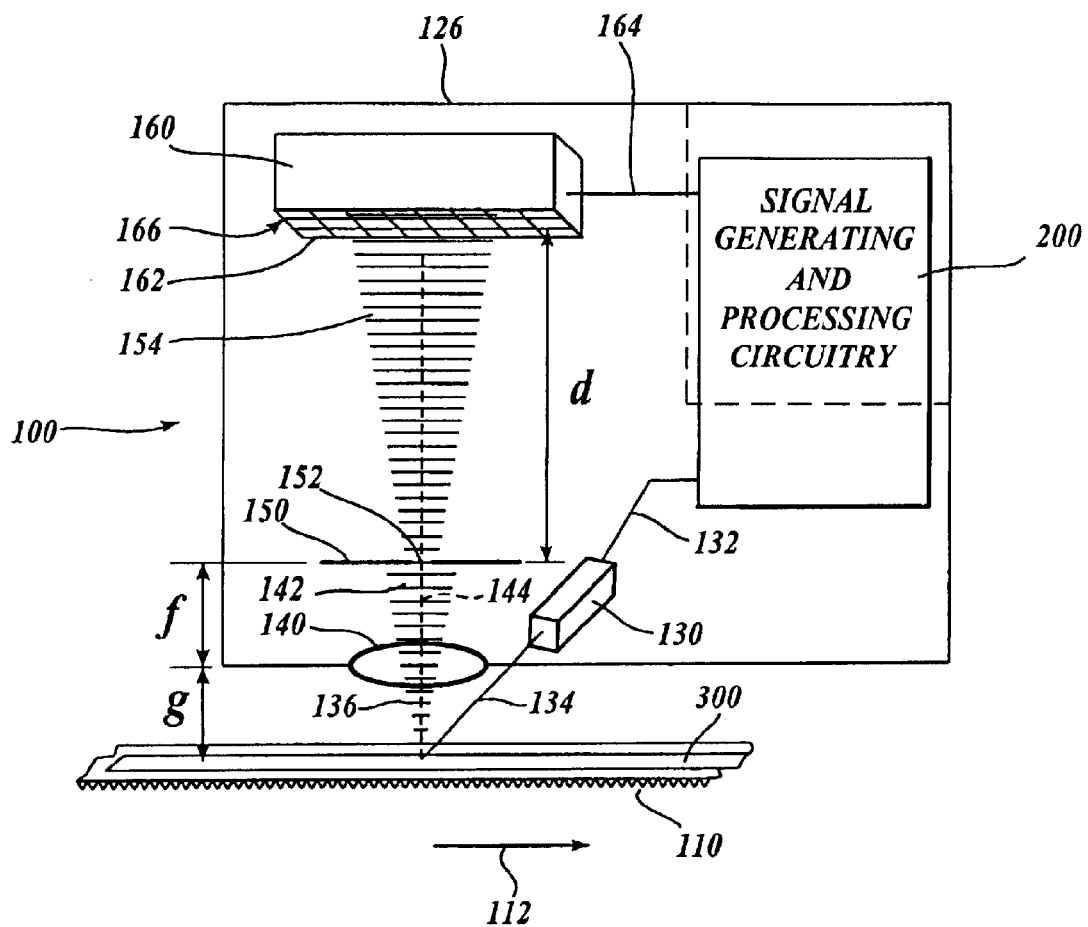
FIG. 1 is a block diagram of an optical position transducer according to this invention.

FIG. 1 is a block diagram of an optical absolute position encoder 100 usable with an integrated absolute scale according to this invention to generate an absolute position measurement. The optical absolute position encoder 100 shown in FIG. 1 includes a readhead 126, signal generating and processing circuitry 200 and a scale 110. The scale 110 includes an integrated scale track 300. In FIG. 1, the components of the readhead 126, and their relation to the scale 110 and the integrated scale track 300, are shown schematically in a layout that generally corresponds to an exemplary physical configuration, as further described below.

In particular, the scale 110 is positioned adjacent to an illuminating and receiving end of the readhead 126. When the scale 110 is illuminated by a light beam 134 emitted from that end of the readhead 126 by a light source 130, the emitted light beam 134 is selectively reflected back by the integrated scale track 300 on the scale 10 as a reflected light 136. The reflected light 136 is received by image receiving optical elements positioned at that end of the readhead 126. Various image receiving optical elements are described further below. The scale 110 is positioned at a generally stable distance from the light source 130 and an optical system housed in the readhead 126. The scale 110 moves relative to readhead 126 along an axis of relative motion, such as a measuring axis direction 112, as shown in FIG. 1. The relative motion is generally constrained, such as, for example, by conventional guideways or bearings (not shown) mounted to a frame, to maintain the proper relative position between the readhead 126 and the scale 110. The readhead 126 may include an alignment feature (not shown) which aids in mounting the readhead 126, and aligns the internal components of the readhead 126 relative to the mounting frame and/or the expected axis of relative motion 112 of the scale 110.

The scale 110 generally includes scale elements of a first type and scale elements of a second type, such that the first and second types of scale elements provide a, relatively high contrast image when illuminated with the wavelengths of light provided by the light source 130. In various exemplary embodiments, areas where a patterned material is present on a surface of the scale 110 constitute the first type of scale element, and areas where the patterned material is absent constitute the second type of scale element. It should be appreciated that individual "scale elements", as the term is used herein, do not necessarily have physical boundaries with respect to other scale elements of their own type. Rather it is their contrast with scale elements of the other type, and their presence in designated design areas, regions, or zones of the integrated scale track 300 that they occupy, that distinguishes them as individual elements in the discussions that follow. Accordingly, a substrate surface region of the scale 110 that appears as a continuous "background" or "space" around other specifically patterned materials on the surface of the scale 110 provides a plurality of contrasting scale elements along the integrated scale track 300, in various exemplary embodiments according to this invention.

In various exemplary embodiments, the scale 110 includes a substrate having a diffusely reflecting surface on which a series of relatively unreflective scale elements are formed with a patterned material. It should be appreciated that the relatively high reflectivity of the scale 110 can be obtained by any known or later developed material and/or structure. For example, the scale 110 can have an appropriate diffusely reflecting surface texture and be made of a relatively reflective material, such as a metal or glass, or a polymer such as Mylar, or the like. The patterned material used for forming the relatively unreflective scale elements can be produced by coating the surface of the scale 110 and removing the material to form the pattern; by differentially processing the surface of the scale 110 in the pattern of the relatively unreflective scale elements to decrease the reflectivity of the material used to form the scale 110; by selectively depositing or applying a relatively non-reflective material on the surface of the scale 110 in a pattern; or the like.

In various other exemplary embodiments, the scale 110 includes a substrate having a relatively unreflective surface on which a series of relatively-reflective scale elements are formed of a patterned material. It should be appreciated that, in this case, the relatively unreflective surface of the scale 110 can be rendered relatively unreflective based on the materials it is formed from, by coating or otherwise treating the surface of the scale 110, or using any other known or later-developed process for selectively decreasing the reflectivity in the appropriate locations along the scale 110. The patterned material used for forming the relatively reflective scale elements can be produced by coating the surface of the scale 110 and removing the material to form the pattern, by differentially processing the surface of the scale 110 in the pattern of the relatively reflective scale elements to increase the reflectivity of the material used to form the scale 110, by selectively depositing or applying a relatively reflective material on the surface of the scale 110 in a pattern, or the like.

It should be appreciated that in various embodiments, the scale 110 may have scale elements formed of more or less specular surface portions. In such embodiments where the scale elements formed of the specular surface portions primarily reflect light beam 134 from the light source 130 into the image receiving optical elements of the readhead 126, these scale elements are the relatively reflective scale elements. In such embodiments where the scale elements formed of the specular surface portions primarily reflect light beam 134 from the light source 130 away from the image receiving optical elements of the readhead 126, these scale elements are the relatively unreflective scale elements. However, in either case for such scales, the image contrast and/or intensity will exhibit more sensitivity to alignment variations and/or surface contamination on the scale, which may reduce the robustness and measurement accuracy of the absolute measurement system. It should also be appreciated that, in various other exemplary embodiments, the scale 110 and/or the scale elements included on the scale 110 may include colors that enhance the contrast between the scale elements in the image of the scale track 300 detected by the light detector 160.

As shown in FIG. 1, the image receiving optical elements of the readhead 126 include a lens 140 positioned at the illuminating and receiving end of the readhead assembly 126 such that an optical axis 144 of the lens 140 is generally aligned with the illuminated area of the scale 110. In the exemplary embodiment shown in FIG. 1, the readhead 126 further includes a pinhole aperture plate 150, spaced apart from the lens 140 along the optical axis 144 by a distance coinciding with the focal length f of the lens 140, and a light detector 160 spaced apart from the aperture plate 150 along the optical axis 144. Such a telecentric arrangement makes the magnification of the image of the integrated scale track 300 on the light detector 160 approximately independent of the object distance g from the lens 140 to the integrated scale track 300. In various exemplary embodiments, if the object distance g is sufficiently well controlled by accurate bearings, or the like, the aperture plate 150 may be omitted.

An exemplary spacing and positioning of the scale 110 and the readhead 126, including the lens 140, the aperture plate 150, and the light detector 160, is further described below. The mounting of the light source 130, the lens 140, the aperture plate 150, and the light detector 160 in the housing of the readhead 126 may be done according to conventional methods of miniature optical system construction and/or industrial camera construction, provided that the components are mounted in a precise and stable manner.

When the readhead 126 is suitably positioned adjacent to the scale 110, each image captured by the light detector 160 will contain a portion of the integrated scale track 300.

In various exemplary embodiments, the light detector 160 has an array 166 of image elements 162 spaced apart along two axes at a known spacing. A known spacing corresponding to the measuring axis direction provides the basis for measuring the displacement or offset between two similar images projected onto the light detector 160 or an image projected onto the light detector 160 and a synthetic image generically corresponding to an obtained image. The known spacing corresponding to the measuring axis direction thus also provides the basis for measuring the displacement of the images of the integrated scale track 300 to resolution as fine or finer than the known spacing. The light detector 160 can be any known or later developed type of light sensitive material or device that can be organized into an array of independent and individual light sensing elements such as a camera, an electronic or digital camera, a CCD array, an array of CMOS light sensitive elements, or the like.

The readhead 126 also includes at least a portion of the signal generating and processing circuitry 200. As shown in FIG. 1, a signal line 132 from the signal generating and processing circuitry 200 is connected to the light source 130, to control and/or drive the light source 130. A signal line 164 connects the light detector 160 and the signal generating and processing circuitry 200. In particular, each of the image elements 162 of the array 166 can be individually addressed to output a value representing the light intensity on that image element 162 over the signal line 164 to the signal generating and processing circuitry 200. Additional portions of the signal generating and processing circuitry 200 may be placed remotely from the readhead 126, and the functions of the readhead 126 can be operated and displayed remotely. The signal generating and processing circuitry 200 is described in greater detail below, with respect to FIG. 13.

As shown in FIG. 1, when the light beam 134 illuminates a portion of the integrated scale track 300, only the light 136 that is reflected along the optical axis 144 contributes to the image of the scale track 300 on the light detector 160.

When the illumination angle of the light beam 134 is oblique, the angle between the incident light beam 134 and the optical axis 144 may be such that relatively specular surfaces on the scale 110 will reflect the light incident on the relatively specular surfaces away from the field around the optical axis 144 that is detected by the readhead 126. In that case, in various exemplary embodiments, it is useful if the portions of the scale 110 that are intended to provide relatively higher intensity in the detected image are made to provide diffuse reflection along the direction of the optical axis 144. In this case, the diffuse surface portions will tend to be brighter and/or provide higher image contrast than they would in the absence of being made relatively diffuse. In various exemplary embodiments, the diffuse surface portions may be relatively diffuse due to their surface finish or material characteristics, or by the application of diffuse coatings or surfacing texturing, or the like.

Figure 2:
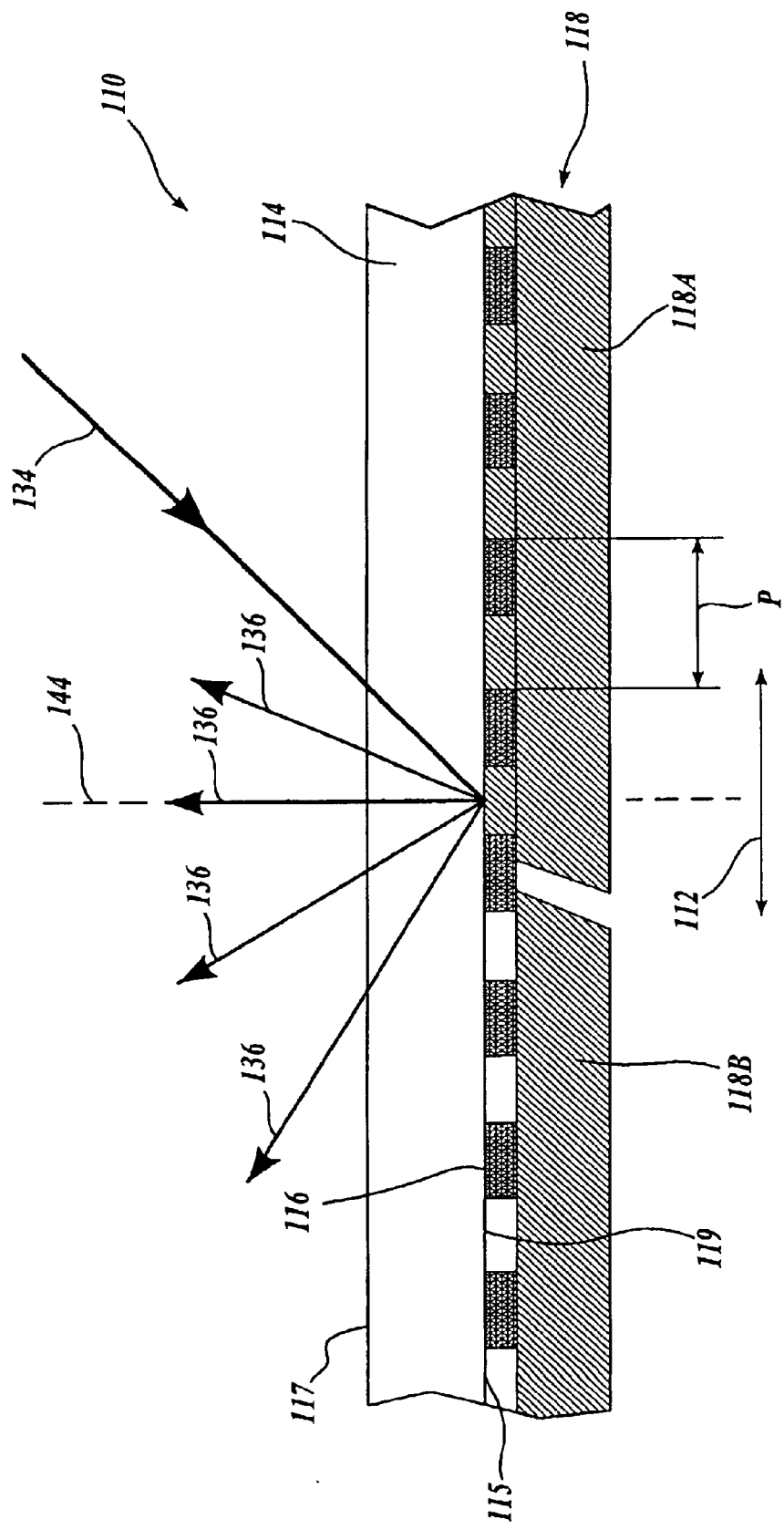
FIG. 2 is a side view of one exemplary embodiment of a diffusely-reflecting scale according to this invention.

FIG. 2 shows a side view of one exemplary embodiment of a portion of a scale 110 that is usable when the angle between the incident light beams 134 and the optical axis 144 is such that the light incident on the relatively specular surfaces will reflect away from the field detected by the readhead 126. It should be appreciated that, in FIG. 2, in the vertical direction the apparent thickness of the first scale elements 116 is greatly exaggerated for the purpose of illustration. In various exemplary embodiments, the first scale elements 116 will generally be formed by a relatively thin layer of material on a surface of the scale 110.

In the exemplary view shown in FIG. 2, the first scale elements 116 are formed in a periodic pattern having an incremental pitch p on a first surface 115 of a substrate 114 used to form the scale 110. This incremental pitch p, also called the period p, is a characteristic of various periodic portions of the integrated scale track 300, as described in greater detail below. As shown in FIG. 2, the incremental pitch p is equal in length to a distance spanned by one of the periodically placed first scale elements 116 and an adjacent interleaved second scale element 119 or, equivalently, to the distance between corresponding edges of consecutively arranged scale elements of the same type. In the exemplary embodiment shown in FIG. 2, the scale 110 is oriented such that a second surface 117 of the substrate 114 of the scale 110 is nearer to the source of the light beam 134. In this case, the substrate 114 should be transparent to at least one wavelength of the light beam 134. A diffuse backing 118 is formed or provided on, over or very near to the first surface 115, such that the diffuse backing 118 provides a diffusely reflecting surface in the pattern of second scale elements 119 between the first scale elements 116. This diffuse backing or coating 118 diffusely directs at least some of the incident light of the light beam 134 as the light 136 along the optical axis 144.

In one exemplary embodiment, the diffuse backing 118 is a diffusely reflecting coating type backing 118A, which is a sprayed-on coating that coats the surface 115 in the spaces that form the second scale elements 119 between the first scale elements 116. In another exemplary embodiment, the diffuse backing 118 is a diffusely reflecting substrate-type backing 118B, which is abuts the surface 115 as closely as possible and reflects the light beam 134 in the spaces that form the second scale elements 119 between the first scale elements 116. In various exemplary embodiments, the substrate-type backing 118B is provided as the surface of a mounting member that holds the scale 110.

It should be appreciated that the exemplary embodiment of the scale 110 shown in FIG. 2 provides several advantages. In this exemplary embodiment, the scale 110 is easy to fabricate, in that the operable extents and locations of the diffuse surface portions forming the second scale elements 119 of the scale 110 are effectively defined by the edges of the first scale elements 116. Thus, the diffuse portions forming the second scale elements 119 of the scale 110 require no special processing to control the extents or locations of these diffuse portions. Furthermore, for the orientation of the scale 110 shown in FIG. 2, contamination on the surface 117 will tend to be out of focus in the detected image of the scale. Furthermore, the surface 115 is protected from damage by the substrate 114 and/or the diffuse backing 118 and/or possibly by an external mounting element that abuts the surface 115. However, as previously discussed, in general, any scale configuration or orientation may be used to that provides a relatively high contrast scale image according to this invention when illuminated with the wavelengths of light provided by the light source 130.

The reflected light 142 from the illuminated portion of the integrated scale track 300 that reaches the lens 140 is then projected onto the light detector 160. In various exemplary embodiments, the lens 140 can be a biconvex lens having a diameter of approximately 3 mm and a focal length f of approximately 4.5 mm. As previously mentioned, in various exemplary embodiments the light 142 passes through a pinhole aperture 152 in the pinhole aperture plate 150. The lens 140 is spaced from the pinhole aperture plate 150 by a distance that is equal to the focal length f of the lens 140, making the magnification of the image of the integrated scale track 300 on the light detector 160 approximately independent of the object distance g.

In particular, when the pinhole aperture plate 150 is used, the light 154 passed by the pinhole 152 is then projected a distance d along the optical axis 144 and onto the surface of the image elements 162 of the array 166 of the light detector 160. For such a telecentric configuration, the magnification of the image features of the integrated scale track 300 thus depends primarily on the relationship between the focal length f and the distance d, and is approximately equal to d/f.

More generally, for configurations where the aperture is relatively large or the pinhole aperture plate 150 is omitted, the magnification will vary with the object distance g. In this case, the approximate magnification M of the image features within the detected portion of the light reflected from the illuminated portion of the integrated scale track 300 onto the array 166 of the image elements 162 is:

$$M \approx (f+d)/g, \quad (1)$$

where:
g is the object distance;
f is the focal length of the lens 140; and
d is the distance to the surface of the array 166, beyond the focal length of the lens 140.

In various exemplary embodiments, typical values for these parameters of the optical position transducer 100 include: g≈4.5 mm, f=4.5 mm, and d=28.35 mm. As a result, the approximate corresponding magnification M is 7.3. It should be appreciated that in selecting of the size of the pinhole aperture 152 there is also a tradeoff between the depth of field of the image of the integrated scale track 300, that is, the amount of blurring of the image when then object distance g is varied due to readhead gap misalignment or the like, and the image intensity on the array 166. In one exemplary embodiment, the pinhole aperture 152 has a diameter of 0.8 mm. In various other exemplary embodiments, the pinhole aperture 152 has a diameter between 0.5 and 2.0 mm. In cases where it is difficult to precisely calculate a magnification, it should also be appreciated that the effective magnification can also be determined experimentally for a given position encoder design and specified operating parameters.

To achieve high resolution displacement measurements, the periodically placed incremental scale elements should be imaged onto the image elements 162 of the light detector 160 such that each incremental scale element spans at least one pixel along the measuring axis direction in the image. That is, the dimension along the measuring axis direction of the periodically placed incremental scale elements times the projected image magnification provided by the readhead is most usefully greater than the pixel pitch of the image elements 162 along the corresponding direction in the image. Moreover, in various embodiments of the readhead 126, the magnified dimension of the periodically placed incremental scale elements along the measuring axis direction in the image is approximately two times to ten times the pixel pitch of the image elements 162 along that direction.

To acquire an image, the signal generating and processing circuitry 200 outputs a drive signal on the signal line 132 to drive the light source 130 to emit the light beam 134. The light beam 134 illuminates a portion of the integrated scale track 300, which is imaged onto the array 166 of the image elements 162 of the light detector 160. The signal generating and processing circuitry 200 then inputs a plurality of signal portions over the signal line 164, where each signal portion corresponds to the image value detected by one or more of the individual image elements 162.

To determine the current displacement of the readhead 126 relative to the integrated scale track 300, the signal portions for a current image received from the light detector 160 by the signal generating and processing circuitry 200 are input and stored in memory. The current image is then analyzed to determine the absolute position between the readhead and the scale. In various exemplary embodiments, one row of the image elements 162 extending in a direction corresponding to the measuring axis direction 112, or at most a small number of rows, of the current image are selected for analysis.

The selected one or more rows are then analyzed to locate one or more columns of the current image that correspond to one or more code element zones of a code portion that appears in the current image. The code element zone(s) of the code portion are then decoded. Since the location of each particular code portion along the scale 110 is predefined, identifying or decoding the code portion that appears in the current image frame determines the absolute position of the current image frame and, thus, the position of the readhead 126 relative to the scale 110, to a first resolution similar to the spacing between the code portions along the scale 100. Determination of the position to a first resolution is discussed in greater detail below.

Also, the location of the code portion, or of a local datum characteristic associated with the code portion, is determined relative to the current image frame, that is, relative to the array 166 of the image elements 162. This determined location relative to the current image frame refines the absolute position of the readhead 126 relative to the scale track 300 from the first resolution indicated by the decoded code portion to a second resolution. In various exemplary embodiments, this second resolution is a pixel resolution and corresponds to the pixel spacing or pitch of the imaging elements 162 in the array 166. It should be appreciated that the highest achievable second resolution corresponds to a resolution that reduces the uncertainty of the absolute location measurement to a resolution corresponding to the magnification provided by the readhead 126 and no more than one to two pixel pitch increments of the array 166. However, more generally, the second resolution will locate the scale 110 relative to the readhead 126 to within a specific period of length p of the periodic portion of the integrated scale track 300. The characteristic period p of the periodic portion of the integrated scale track 300, also called the incremental pitch p, has been previously described with reference to FIG. 2. Determination of the position to a second resolution is discussed in greater detail below.

At least a portion of the current image is then compared, on a pixel-by-pixel basis, to a reference image for each of a number of offset positions to determine the absolute position of the readhead to the scale to a third resolution. In various exemplary embodiments, the third resolution corresponds to a sub-pixel resolution position determination of the image on the array 160. The series of comparisons generates at least one correlation curve peak, as disclosed in detail in U.S. patent application Ser. No. 09/731,671, incorporated herein by reference in its entirety.

That is, the reference image and the current image are processed to generate a correlation function. In an exemplary embodiment, the current image is digitally shifted relative to the reference image over a range of offsets, or spatial translation positions that include an offset that causes the pattern of the two images in the vicinity of the previously-located specific period to most nearly align. The correlation function indicates the degree of pattern alignment, and thus indicates the amount of offset required to get the two images to align as the images are digitally shifted. This offset then is used to refine the absolute position of the readhead 126 relative to the scale 110 from the second resolution to a third resolution corresponding to significantly less than one pixel pitch increment of the array 166 divided by the magnification provided by the readhead 100. Determination of the position to a third resolution is discussed in greater detail below.

In various exemplary embodiments, the reference image is a synthetic image of a periodic portion of the integrated scale track 300. In various other exemplary embodiments, the reference image is a synthetic image of a periodic portion of the integrated scale track 300 that is modified to mimic image smearing effects determined based on expected and/or displayed smearing effects in the current image. In various other exemplary embodiments, the reference image is a representative image captured from the integrated scale track 300 using the readhead 126. In various other exemplary embodiments, the reference image is a representative image captured from the integrated scale track 300 that is modified to mimic image smearing effects determined based on expected and/or displayed smearing effects in the current image.

It should be appreciated that there are a number of different techniques for comparing the reference image to the current image. For example, in a first exemplary technique, the entire length of the frame of the current image may be used when comparing the selected one or more rows on a pixel-by-pixel basis to the width of the entire frame of the reference image to generate a single correlation value. In this case, those pixels that lie in regions of the reference and current images that do not overlap with a region of the other of the current reference and displaced images are compared to pixels having a default comparison value, or are assigned a default comparison value, or the like. In other exemplary techniques, a partial image is compared. In either case, the series of correlation values that indicate the correlation peak is generated by shifting the current image by one or more pixels relative to the reference image after each comparison is performed.

Figure 3:
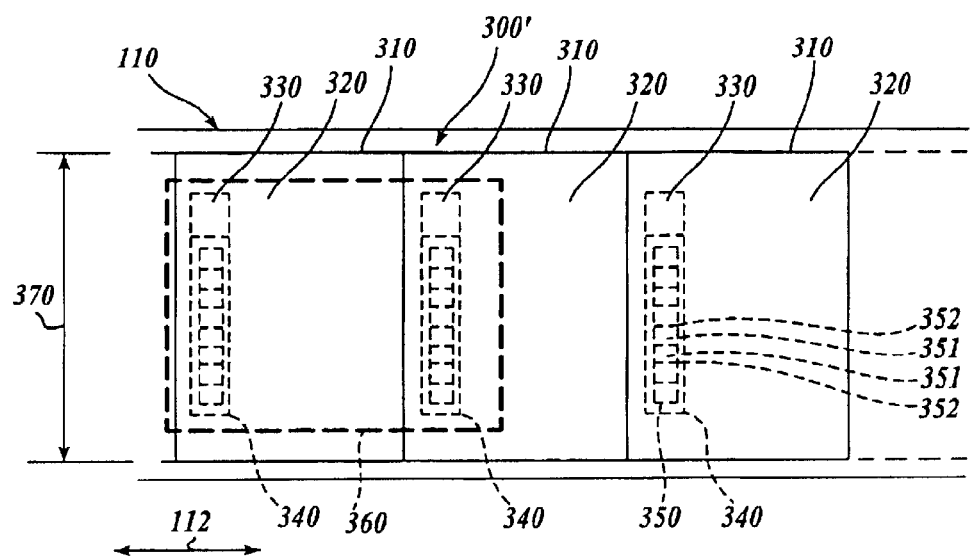
FIG. 3 illustrates an integrated absolute scale including a first exemplary embodiment of a generic integrated scale track according to this invention.

FIG. 3 illustrates the scale 110 and a block diagram layout of a first exemplary embodiment 300' of the integrated scale track 300 according to this invention. As shown in FIG. 3, the integrated scale track 300' includes a plurality of coded segments 310. Each coded segment 310 includes a code portion 340 and a periodic portion 320. The periodic portions 320 and the code portions 340 share, or are "integrated" into each coded segment 310. Optionally, in some exemplary embodiments, the coded segments 310 also include a predetermined feature 330, discussed further below. Optionally, in some exemplary embodiments, the coded segments 310 also include one or more empty portions in addition to the code portion 340 and the periodic portion 320. That is, the code portion 340, the periodic portion 320, and the predetermined feature 330 need not completely fill each coded segment 310.

In various exemplary embodiments, the periodic portion 320 includes any portion of the coded segment 310 that is not specifically a code portion 340, or a predetermined feature 330. Thus, in one sense, in such embodiments, the code portion 340 and/or the predetermined feature 330 may alternatively be described as being "embedded" in the periodic portion 320 of the coded segment 310.

It should be appreciated from the foregoing description that the plurality of periodic portions 320 and the plurality of code portions 340 thus share, or are "integrated" into, a single scale track 300, having a track width 370, extending along the measuring axis direction 112 as shown in FIG. 3. The track width 370 is determined by and coincides with the extents of the periodic portions 320 along the direction perpendicular to the measuring axis direction 112. That is, the plurality of periodic portions 320 each extends across the measuring axis direction by the nominal track width 370 and the plurality of code portions 340 lie within this same track width. In various exemplary embodiments, the periodic portions 320 and the code portions 340 are arranged in an alternating repeating sequence along the entire length of the scale 110. In various other exemplary embodiments, the code portions 340 are embedded in the periodic portions 320, that is, the periodic portions extend alongside the code portions 340, on either side, along the length of the scale 110.

As shown in FIG. 3, the code portions 340 include a code element zone 350 located along the measuring axis direction 112 of the scale 110 and extending along a direction perpendicular to the measuring axis direction 112. The code element zone 350 is divided into a plurality of individual code element sub-zones 351 separated by a plurality of nominal code element boundaries 352. The nominal code element boundaries 352 generally coincide with the boundaries or transitions between individual code elements that are located in the individual code element sub-zones 351.

Thus, it should be appreciated that the code element boundaries generally extend along the measuring axis direction 112, which is also the direction of relative motion between the scale 110 and the readhead 126 during operation. Correspondingly, the transitions between individual code elements occur along a direction perpendicular to the motion direction, that is, perpendicular to the measuring axis direction 112. As discussed in detail below, this feature facilitates operation that is more robust and faster signal processing operations during high-speed motion in various exemplary embodiments according to this invention.

It should be appreciated that, by integrating both the periodic portions 320 and the code portions 340 into the track width 370, a sensing element positioned over the single integrated scale track 300 anywhere within the track width 370, such as an image element 162 of the light detector 160, is usable to sense the information contained in either the periodic portions 320 and/or the code portions 340, regardless of the position of the readhead 126 along the scale 110. Thus, in various exemplary embodiments, the alignment of the integrated scale track 300 and the readhead 126 in the direction transverse to the measuring axis direction 112 is not critical, which provides for easier setup and allows the measuring operations to be more robust and/or performed faster, as described further below. Furthermore, the overall width of the scale 110 and readhead 126 can be reduced.

As shown in FIG. 3, a detection window 360 that corresponds to the portion of the integrated scale track 300 that can be captured as a single image by the light detector 160 extends along the scale 110 and across at least some of the width 370 of the integrated scale track 300 on the scale 110. It should be appreciated that, due to the configuration of the integrated scale track 300 according to this invention, in various exemplary embodiments, the width and specific location of the detection window 360 transverse to the measuring axis 112 within the integrated scale track 300 is not critical, provided that the width of the detection window 360 approximately approaches the track width 370 and is located such that its span transverse to the measuring axis 112 encompasses the width of the code portion 340 transverse to the measuring axis 112. However, it should be appreciated that as the width of the detection window 360 is increased to approach the width 370 of the integrated scale track 300', the signal to noise ratio of the measurement system generally improves.

It should be appreciated that, in various exemplary embodiments, the size of the light detector 160 and the magnification provided by the optics 140–152 of the readhead 126 are such that, in cooperation with the extents of the portions 320 and 340 along the measuring axis direction 112, the detection window 360 extends sufficiently along the measuring axis direction 112 that a complete code portion 340 is guaranteed to appear in the detection window 360 regardless of the position of the readhead 126 along the scale 110. If the detection window 360 is at least this long, then decoding the complete code portion 340 is significantly simplified relative to situations where some positions of the readhead 126 result in two incomplete code portions 340 appearing in the detection window 360.

Alternatively, in various exemplary embodiments, the detection window 360 extends sufficiently along the measuring axis direction 112 that the information equivalent of a complete code portion 340 can be "reconstructed" from two separated segments of sequential code portions 340 regardless of the relative position of the readhead 126 and the scale 110. In order to satisfy this condition, the detection window 360 generally extends along the measuring axis direction 112 by an amount equal to or somewhat greater than the distance from the edge of one code portion 340 of the scale 110 to the corresponding edge of an adjacent code portion 340. Such a distance generally includes somewhat more than a complete code portion 340 and a complete periodic portion 320 along the measuring axis direction 112, that is, somewhat more than a complete coded segment 310.

In any case, for such an extent of the detection window 360, the patterns of the code portions 340 must be chosen in light of the intended reconstruction technique. For example, the patterns may be chosen as sequential binary number codes or according to known pseudo-random "chain" code techniques, or the like. However, it should be appreciated that the structure and arrangement of the code portions 340 according to this invention are conducive to employing sequential binary number codes or the like, which simplifies and speeds up various signal processing and position determination operations in various exemplary embodiments according to this invention. It should be appreciated that the associated reconstruction operations may be simplified and/or made more robust or faster in exemplary embodiments that include the predetermined feature 330 proximate to, or included in, the code portions 340.

In the first exemplary embodiment of the integrated scale track 300' shown in FIG. 3, the predetermined portions 330 are located at one end of the code portions 340. However, it should be appreciated that, in various other exemplary embodiments, predetermined portions 330 are located at both ends of each code portion 340. In this case, the predetermined portions 330 at one end of the code portions 340 may be distinct from the predetermined portions 330 at the other end of the code portions 340. In various other exemplary embodiments, the predetermined portions 330 are located more toward the center of the code portions 340. In various other exemplary embodiments, the predetermined portions 330 are adjacent to the code portions 340 along the measuring axis direction 112. In various other exemplary embodiments, the predetermined portions 330 comprise any consistent feature or combinations of features included in each of the code portions 340. That is, in various exemplary embodiments, the predetermined portions 330 may be merged with and/or indistinguishable from the code portions 340.

The predetermined portions 330 may be any feature or combination of features that may be reliably and readily distinguished from the other pattern features of the periodic portions 320 and/or the code portions 340. For example, such features include, but are not limited to: a bright or dark scale element that has a unique length along the measuring axis direction 112 and/or transverse to the measuring axis direction 112; a unique pattern of bright and/or dark scale elements along the measuring axis direction 112 and/or transverse to the measuring axis direction 112; and or one or more scale elements which have a unique color or intensity detectable by the image elements 162 of the light detector 160. In various exemplary embodiments, all of the predetermined portions 330 are identical.

Figure 4:
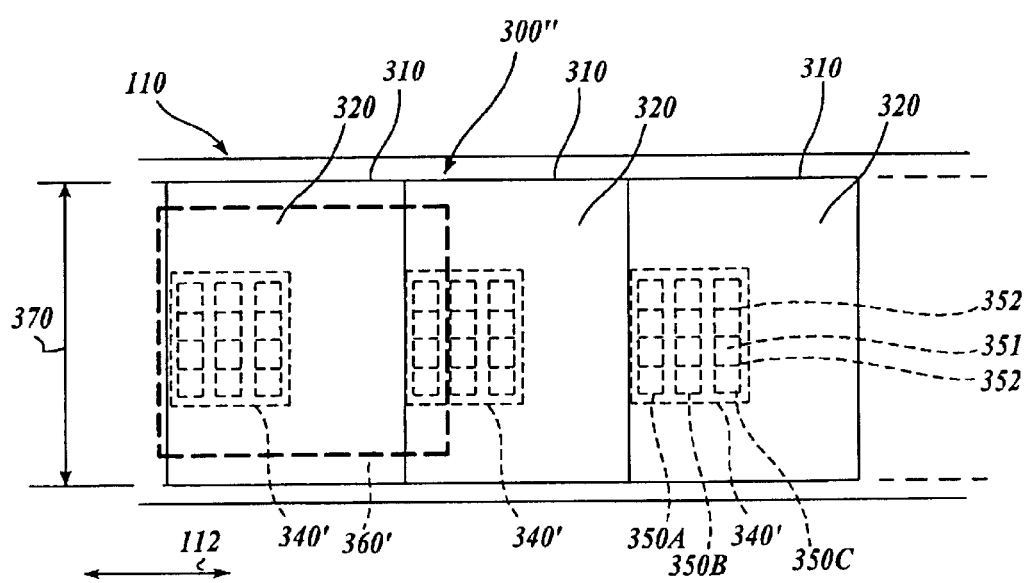
FIG. 4 illustrates an integrated absolute scale including a second exemplary embodiment of a generic integrated scale track according to this invention.

FIG. 4 illustrates the scale 110 and a block diagram layout of a second exemplary embodiment 300" of the integrated scale track 300 according to this invention. The features and elements of the second exemplary embodiment 300" are designed according to similar considerations and operate similarly to the similarly numbered features and elements of the first exemplary embodiment 300', shown in FIG. 3, unless otherwise indicated. As shown in FIG. 4, the integrated scale track 300" includes a plurality of coded segments 310, which each include a code portion 340' and a periodic portion 320. Optionally, in some exemplary embodiments, the coded segments 310 also include a predetermined feature 330, not shown.

In various exemplary embodiments, the periodic portion 320 includes any portion of the coded segment 310 that is not specifically a code portion 340', or a predetermined feature 330. Thus, in one sense, in such embodiments, the code portion 340' and/or the predetermined feature 330 may alternatively be described as being "embedded" in the periodic portion 320 of the coded segment 310.

Similarly to the first exemplary embodiment 300', the plurality of code portions 340' share, or are "integrated" into, a single scale track 300, having a track width 370 that is determined by and coincides with the extents of the periodic portions 320 along the direction perpendicular to the measuring axis direction 112. The plurality of code portions 340' lie within this same track width. In the exemplary embodiment shown in FIG. 4, the code portions 340' are embedded in the periodic portions 320, that is, the periodic portions extend alongside the code portions 340', on either side, along the measuring axis direction 112 of the scale 110.

As shown in FIG. 4, the code portions 340' include a plurality of code element zones 350, that is, the code element zones 350A–350C. Each of the code element zones 350A–350C is located along the measuring axis direction 112 of the scale 110 and extends along a direction perpendicular to the measuring axis direction 112. Each code element zone 350A–350C is divided into a plurality of individual code element sub-zones 351 separated by a plurality of nominal code element boundaries 352. The nominal code element boundaries 352 generally coincide with the boundaries or transitions between individual code elements that are located in the individual code element sub-zones 351. Thus, it should be appreciated that the transitions between individual code elements occur along a direction perpendicular to the motion direction, that is, perpendicular to the measuring axis direction 112. As discussed in detail below, this feature facilitates more robust and faster signal processing operations during high-speed motion in various exemplary embodiments according to this invention.

In various exemplary embodiments according to this invention the plurality of code element zones 350 included in a code element portion, such as the code element portion 340', have similar dimensions and their respective pluralities of individual code element sub-zones 351 are aligned along the measuring axis direction 112, approximately as shown FIG. 4. This simplifies and speeds up various image searching and signal processing operations in various exemplary embodiments according to this invention.

Similarly to the first exemplary embodiment 300', in the second exemplary embodiment 300", it should be appreciated that by integrating the both the periodic portions 320 and the code portions 340' into the track width 370, a sensing element positioned over the single integrated scale track 300 anywhere within the track width 370, such as an image element 162 of the light detector 160, is usable to sense the information contained in either the periodic portions 320 and/or the code portions 340' at various positions of the scale 110 relative to the readhead 126 along the measuring axis direction 112. Thus, in various exemplary embodiments, the alignment of the integrated scale track 300 and the readhead 126 in the direction transverse to the measuring axis direction 112 is not critical, which provides for easier setup and allows the measuring operations to be more robust and/or performed faster, as described further below. Furthermore, the overall width of the scale 110 and readhead 126 can be reduced.

FIG. 4 also shows a detection window 360'. In the embodiment shown in FIG. 4, the width of the detection window 360' approximately approaches the track width 370 and is located such that its span transverse to the measuring axis 112 encompasses the width of the code portion 340' transverse to the measuring axis 112. Furthermore, the detection window 360' extends sufficiently along the measuring axis direction 112 that the information equivalent of a complete code portion 340' can be "reconstructed" from two separated segments of sequential code portions 340' regardless of the relative position of the readhead 126 and the scale 110. In order to satisfy this condition, the detection window 360 generally extends along the measuring axis direction 112 by an amount equal to or somewhat greater than the distance from the edge of one code portion 340' of the scale 110 to the corresponding edge of an adjacent code portion 340'. Such a distance generally includes somewhat more than a complete code portion 340' and a complete periodic portion 320 along the measuring axis direction 112, that is, somewhat more than a complete coded segment 310. At some positions of the readhead 126, such a detection window 360 is also generally sufficient to include one complete centrally-located code portion 340' bounded at least by a number of complete periods of scale elements of the periodic portions 320 that is one less than the number of periods of scale elements normally included in the periodic portion 320 of a coded segment 310.

It should be appreciated that the extent of the detection window 360' and the patterns of code portions 340' in coded segments 310 that are adjacent along the scale 110 are generally chosen interdependently. That is, if adjacent incomplete code fragments are to be combinable in an intended code reconstruction or decoding technique, the code structure must be such that the any single image in the detector window 360' includes enough information to properly combine the adjacent incomplete code fragments. For example, the patterns may be chosen as sequential binary number codes or according to known pseudo-random "chain" code techniques, or the like.

However, as described above, it should be appreciated that the structure and arrangement of the code portions 340' according to this invention are conducive to employing sequential binary number codes or the like, which simplifies and speeds up various signal processing and position determination operations in various exemplary embodiments according to this invention. Furthermore, it should be appreciated that the associated reconstruction operations may be simplified and/or made more robust or faster in exemplary embodiments where a predetermined feature 330, such as that shown in FIG. 3, is included proximate to, or included in, the code portions 340'.

Hereafter, in the following discussion, it should be understood that the similarly numbered features of the first exemplary embodiment 300' and the second exemplary embodiment 300" of the integrated scale track 300 according to this invention are generally designed and operated according to similar considerations. Thus, the following general discussion will be understood to encompass the operation of the similarly numbered elements of the second exemplary embodiment 300", and the like, as well as the operation of the explicitly numbered elements of first exemplary embodiment 300', unless otherwise indicated by context or content in the following discussions.

With reference to both the first exemplary embodiment 300' and the second exemplary embodiment 300" of the integrated scale track 300 according to this invention, depending on the signal processing algorithms used, the predetermined portions 330 may be omitted. However, it should be appreciated that using such predetermined portions 330 may simplify the signal processing algorithms used for rapidly and robustly identifying and locating the code portions 340 within the detection window 360.

Regardless of whether the predetermined portions 330 are included, each respective code portion 340 in each of the respective coded segments 310 contains a distinct and/or unique pattern of code elements. This distinct and/or unique pattern of code elements allows a particular code portion 340 that appears in the detection window 360 to be definitely determined. Since the location of each particular code portion 340 in each particular coded segment 310 along the scale 110 is predefined or can be calculated, identifying which code portion 340 appears in the detection window 360 allows the absolute position of the detection window 360, and thus the readhead 126, relative to the scale 110 to be roughly determined at a first resolution similar to the length of the coded segments 310 and/or the spacing between the code portions 340.

While the location of a given code portion 340 on the scale 110 relative to a given origin point may be known to a high degree of accuracy and precision, the locations of the code portion 340 and the periodic portion 320 relative to the detection window 360 are not necessarily known based on the operations of simply determining the code value of the code portion 340 appearing in the detection window 360. In particular, the portions 340 and could be located anywhere within the detection window 360.

As indicated above, the measurement value corresponding to any particular code portion 340 can be predefined or calculated by the distinct and/or unique pattern that it includes. In various exemplary embodiments, the distinct and/or unique pattern is stored within a look-up table that also stores the measurement value of the nominal location on the scale 110 corresponding to the code portion 340 that contains that distinct and/or unique pattern. In this case, in various exemplary embodiments, the distinct and/or unique patterns can occur in any desired order or sequence, where no relationship between the distinct and/or unique patterns of adjacent code portions 340 needs to be present.

In various other exemplary embodiments, the distinct and/or unique patterns can objectively correspond in some way to the location of the code portions 340 containing them. This correspondence can then be used to directly determine or calculate the absolute position of the code portion 340 along the scale 110, and thus the absolute position of the detection window 360 and thus the readhead 126. In various exemplary embodiments, the code portions 340 are arranged along the scale 110 at a regular pitch, or spacing. The distinct and/or unique pattern of a particular code portion 340 defines a binary or higher-modulus number as the unique pattern or code word. The numbers indicated by the code portions 340 that are sequential along the scale 110 are also sequential.

Thus, for example, a first sequential code portion 340 would have a distinct and/or unique pattern that defines the number "1". The number can then be increased by one increment for each successive sequential code portion 340. In various exemplary embodiments, if the numbers begin with one and are incremented by one, when a particular number is then multiplied by the pitch, or spacing, of the code portions 340 on the scale 110, the absolute position of that code portion 340 from the origin is thus known.

It should be appreciated that, when sequential numbers or code words are used, it is particularly fast and easy to reconstruct a complete code word from a trailing segment of a number or code word of a code portion 340 imaged in a left portion of the detection window 360 and a leading segment of a number or code word of a code portion 340 imaged in a right portion of the detection window 360. Thus, sequential numbers or code words are of particular utility when the span of the detection window 360 relative to the integrated scale track 300' or 300" is desired to be of a minimum usable size that is smaller than that which guarantees that at least one complete uninterrupted code portion 340 is included in an every possible scale image. Of course, more complicated and irregular constructions, formulas and methods can be used to relate the distinct and/or unique patterns and the location of the code portions 340 that contain these distinct and/or unique patterns.

It should be appreciated that, although each particular code portion 340 is distributed over a zone extending along the measuring axis direction, each particular code portion 340 nevertheless uniquely corresponds to or identifies a measurement value associated with a particular point along the scale 110. It should be appreciated that, for each particular point along the scale corresponding to a measurement value indicated by a particular code portion 340, that point can be referred to as a local datum.

In general, when determining the highest resolution position measurement according to this invention, the local datum is associated with the nominal position of a plurality of periodically placed incremental scale elements. A simpler local datum characteristic that is part of, or otherwise highly correlated with the nominal position of the plurality of periodically placed incremental scale elements is also useful for estimating the offset of the local datum relative to the detection window 360. A local datum characteristic may be the edge, center or other any other localizable characteristic of one or more specifically recognizable bright and/or dark bars on the scale 110 that can be located relative to the detection window 360. It should be appreciated that, according to this invention, the local datum and/or the local datum characteristic is not necessarily a separate feature or characteristic that must be specially added to an integrated scale track 300. Rather, the signal processing associated with the images of the integrated scale track 300 may implicitly choose and use any specifically recognizable localizable feature or characteristic of the integrated scale track 300 as the local datum and/or the local datum characteristic.

In one exemplary embodiment, the local datum characteristic is conveniently chosen as a characteristic of a bar of the periodic portion 320 that is immediately adjacent the code portion 340 that indicates the measurement value associated with that local datum. In a further exemplary embodiment, the local datum characteristic is conveniently chosen as a characteristic of the predetermined portion 330 associated with the code portion 340 that indicates the measurement value associated with that local datum. Such exemplary embodiments may simplify the signal processing algorithms required for rapidly and robustly identifying and locating the local datum within the detection window 360.

The local datum characteristic can be located relative to the detection window 360 before, during or after the code portion 340 that appears in the detection window 360 has been analyzed to determine the first-resolution absolute position. For example, identifying and/or locating the local datum may be based on well-known edge-finding or centroid-finding techniques, or the like, applied to image intensity values associated with the various image elements 162. In any case, the location of the local datum characteristic relative to the detection window 360 is used to refine the resolution of the absolute position determination to a second resolution finer than the previously described first resolution.

It should be appreciated that, in various exemplary embodiments of an integrated scale track 300 according to this invention, the local datum characteristic extends along the direction perpendicular to the measuring axis direction 112 by a distance that exceeds the expected static and dynamic misalignments of the readhead 126 and scale 110 transverse to the measuring axis direction 112. Thus, in various exemplary embodiments of a readhead and scale according to this invention, only one predictable row, or at most a few predictable rows, of the imaging elements 162 extending in the direction generally corresponding to the measuring axis direction 112, needs to be analyzed to determine the location of the local datum characteristic to the second resolution. Thus, a system using an integrated scale track 300 according to this invention can achieve fast signal processing while remaining relatively robust with respect to static and dynamic misalignments of the readhead 126 and scale 110 transverse to the measuring axis direction 112.

In general, it is both necessary and sufficient that the second resolution position determination be reliable, robust and accurate to a resolution finer than approximately ½ of the incremental pitch of the periodic portions 320, to insure that the uncertainty in the second resolution position determination is within one such increment of the incremental pitch. In such a case, position determinations including further resolution refinement based on analysis of a periodic portion 320 in the detection window 360 will be unambiguous, even if one period included in the periodic portion 320 is generally indistinguishable from the next.

It should also be appreciated that, in terms of the scale image projected onto the light detector 160, it is both necessary and sufficient that the location of the local datum characteristic be determined relative to the detection window 360 to a resolution finer than approximately ½ of the pitch of the projected image of the scale bars of the periodic portions 320 on the light detector 160, to insure that the uncertainty of the local datum characteristic location is within one such pitch increment on the light detector 160. In various exemplary embodiments, the incremental pitch and the magnification provided the lens 140 are chosen such that the pitch of the projected image of the scale bars of the periodic portions 320 on the light detector 160 is at least three times the pixel pitch of the image elements 162. Accordingly, the location of the local datum characteristic needs be determined relative to the detection window 360 to a resolution no better than approximately one pixel pitch of the image elements 162.

In various other exemplary embodiments, a robust and simple local datum characteristic locating technique is chosen, such as edge-finding at a resolution equal to one pixel pitch or greater, based on pixel intensity value transitions, for example. Then, using the anticipated simple local datum characteristic locating technique, an achievable local datum characteristic location resolution in terms of the pixel pitch is determined or confirmed by experiment, for the relevant anticipated scale features and realistic misalignments, contamination, and the like. Finally, in various exemplary embodiments, the incremental pitch p used for the periodic portions 320 is chosen such that the achievable local datum characteristic location resolution under the variety of realistic experimental conditions is not more than approximately three-eighths of the pitch of the projected image of the scale bars of the periodic portions 320 on the light detector 160. Such configurations are robust, and further allow both simple and fast signal processing.

The periodic portion 320 can be used to refine the determination of the absolute position scale relative to the detection window 360, and thus the readhead 126, to a third resolution. The third resolution has accuracy that is at least a few times finer, and may be several times finer, than the incremental pitch. The third resolution may correspond to locating the projected scale image relative to the detection window 360 to a sub-pixel resolution.

As previously described with reference to FIG. 2, the scale 110 generally includes first scale elements 116 and second scale elements 119 separating the first scale elements 116. The periodic portion 320 has, in various exemplary embodiments, a pattern of incremental first scale elements 116 and second scale elements 119 arranged according to an underlying incremental pitch. One incremental pitch corresponds to the distance spanned by one of the periodically placed first scale elements 116 and an adjacent interleaved second scale elements 119 or, equivalently, to the distance between corresponding edges of consecutively arranged scale elements of the same type. In various exemplary embodiments according to this invention, the second scale elements 119 and the first scale elements 116 have unequal dimensions along the measuring axis direction 112, but they need not be unequal.

In various exemplary embodiments, the periodic portion 320 includes the maximum possible number of complete periods of the incremental first scale elements 116 and the second scale elements 119 that can be included in the periodic portion 320 according to the underlying incremental pitch. However, in various other exemplary embodiments, less than this maximum possible number of complete periods are included in a periodic portion 320. In still other exemplary embodiments, even "odd sized" or "misplaced" scale elements can be included in the periodic portion 320, provided that the number of complete "regular" periods of the first incremental scale elements 116 and the second incremental scale elements 119 and the accuracy of the placement of these scale elements relative to the underlying pitch are sufficient to enable the location the projected scale image of the periodic portion 320 relative to the detection window 360 to be determined to a sub-pixel resolution.

For example, in one exemplary embodiment, the number of complete periods that are included in the periodic portion 320 is the number sufficient to determine a correlation curve having a peak or valley amplitude indicative of a relatively good correlation, as described in greater detail below. In various exemplary embodiments where the image rows extend along the measuring axis direction in the image, by comparing some or all of the rows of at least the portion of the current image corresponding to the periodic portion 320 to a reference image that contains at least a similar periodic portion, on a pixel-by-pixel basis, and by shifting the current and reference images relative to each other by one pixel to create each comparison value, a correlation curve can be created.

It should be appreciated that, in various exemplary embodiments where the second resolution corresponds to a resolution of one pixel pitch, the correlation curve is created only to obtain the subpixel resolution. The incorporated 671 application discloses a variety of methods for determining to a high accuracy the pixel and/or subpixel location of a peak or trough of a correlation curve. It should be appreciated that any of these techniques, or any other appropriate known or later developed technique, can be used to determine the offset position of the projected scale image relative to the detection window 360 to a pixel and/or subpixel resolution. Thus, the position of the scale 110 relative to the readhead 126 is determined to a third resolution and accuracy which is at least a few times finer, and may be several times finer, than the incremental pitch.

It should be appreciated that, when a coded scale track includes predictable periodic portions such as the periodic portions 320 of the integrated scale track embodiment 300' according to this invention, the high-resolution or third resolution position detection techniques usable with such periodic portions are particularly simple, fast and accurate relative to the techniques and results associated with other types of coded scale tracks such as pseudo-random scale tracks and the like. For example, in embodiments that use software and/or hardware based correlation techniques for the high-resolution position determination, the reference image or the hardware detector structure can be a single fixed periodic configuration. Modifications of the hardware detector configuration, or updating or matching the reference image to the current image, or the like, are not required, since all the periodic portions are substantially similar and predictable. Furthermore, the accuracy of software or hardware based detection of the position of a substantially or fully periodic image or image portion tends to be less sensitive to image blur due to readhead misalignment or the like.

Figure 5:
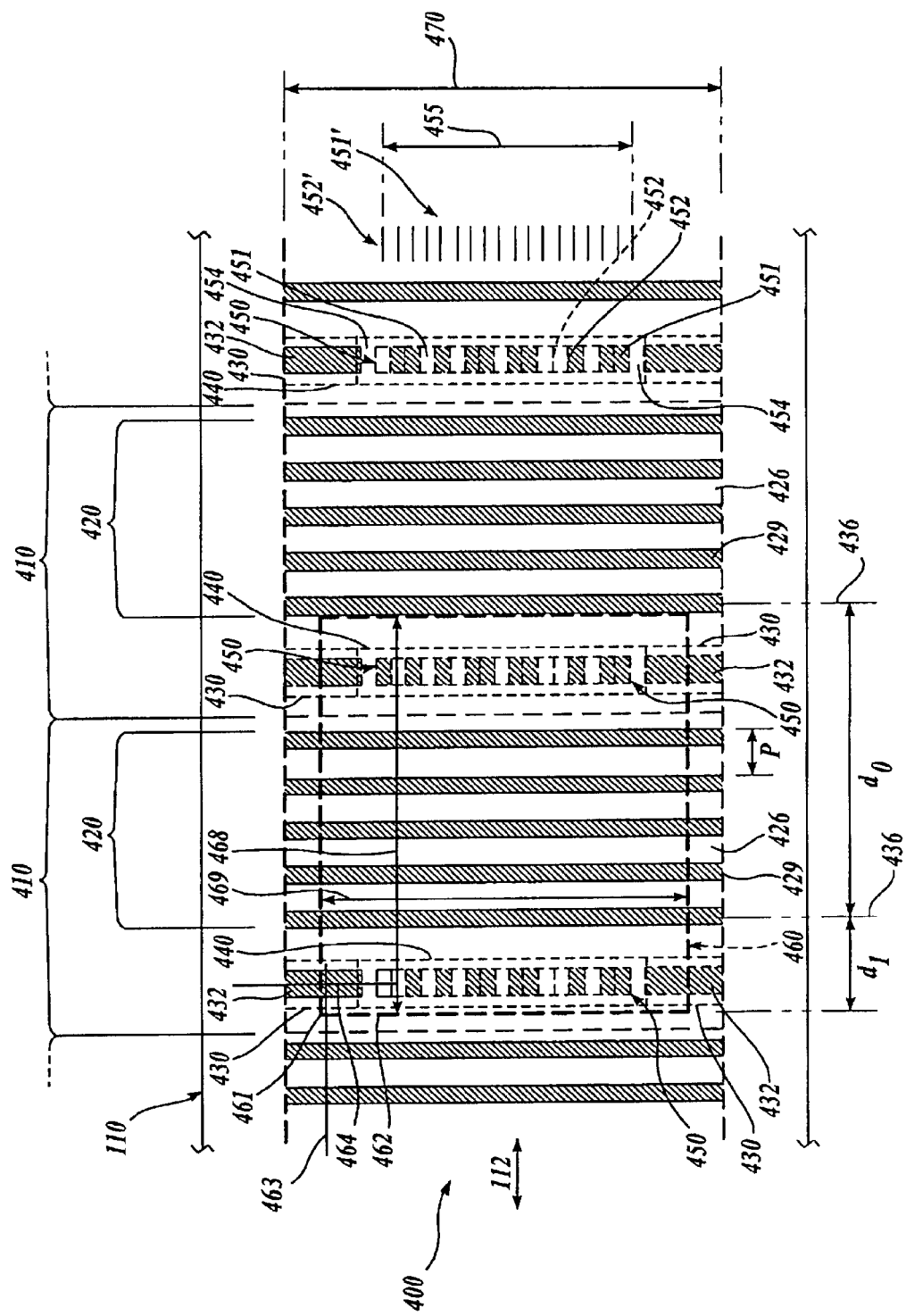
FIG. 5 illustrates a portion of a first specific exemplary embodiment of an integrated scale track according to this invention, which is a first specific exemplary embodiment of the generic integrated absolute scale shown in FIG. 3.

FIG. 5 illustrates the scale 110, a detection window 460 and a first specific exemplary embodiment of an integrated absolute scale track 400 corresponding to the integrated scale track 300' shown in FIG. 3. The readhead 126 moves relative to the integrated scale track 400 along the measuring axis direction 112. As shown in FIG. 5, the integrated absolute scale track 400 includes a plurality of coded segments 410 that repeat along the entire length of the scale 110. Each coded segment 410 includes a code portion 440 and a periodic portion 420 arranged along the measuring axis direction 112. Each coded segment 410 also includes predetermined pattern portions 430 that are located adjacent to each of the upper and lower ends of each of the code portions 440.

The code portions 440 each include a code element zone 450 that is located along the measuring axis direction 112 of the scale 110 and that extends along a direction perpendicular to the measuring axis direction 112. Each code element zone 450 is divided into a plurality of individual code element sub-zones 451, as generally marked in FIG. 5 by indicator spaces 451' included in the span 455. The code element sub-zones 451 are separated by a plurality of nominal code element boundaries 452, as generally marked in FIG. 6 by indictor lines 452' included in the span 455., which coincide with the boundaries or transitions between individual code elements that are located in the individual code element sub-zones 451.

As shown in FIG. 5, individual code elements are present or absent in each individual code element sub-zone 451 to provide a distinct and/or unique pattern of code elements in each code portion 440, as described with reference to the first and second exemplary embodiments 300' and 300", above. The extents of the individual code elements along the measuring axis direction 112 coincide with the extents of the code element zone 450 along the measuring axis direction 112. It should be appreciated that the extents of the individual code elements perpendicular to the measuring axis direction 112 coincide with the nominal code element boundaries 452, even in various code embodiments where they are touching and exhibit no distinguishable physical boundary or image edge transition between the individual code elements. In various exemplary embodiments, the extents of the individual code elements perpendicular to the measuring axis direction 112 are less than their extents along the measuring axis direction 112, such that a relatively large number of code elements can be provided in a relatively small proportion of the area of each coded'segment 410. In various exemplary embodiments, the extents of each individual code element are conveniently made the same. However, in various other exemplary embodiments, the extents of various individual code elements may vary. In this case, this variation is accommodated in the corresponding signal processing algorithms.

The pattern of code individual code elements in each code portion 440 indicates the measurement value associated with a local datum and/or a local datum characteristic 436. As previously discussed, the local datum is associated with the nominal position of a plurality of periodically placed incremental scale elements. A simpler local datum characteristic 436 that is part of, or otherwise highly correlated with the nominal position of the plurality of periodically placed incremental scale elements is also useful for estimating the offset of the local datum relative to the detection window 360. The local datum characteristic 436 is not necessarily a separate feature or characteristic of the integrated scale track 400. Rather, signal processing associated with the integrated scale track 400 implicitly chooses any specifically recognizable localizable feature or characteristic of the integrated scale track 400 as a local datum characteristic 436. In the exemplary embodiment shown in FIG. 5, the local datum characteristic 436 is conveniently chosen as the center of an incremental scale element 429 of a periodic portion 420 that is immediately adjacent to the right of the code portion 440. However, it should be recognized that this choice is somewhat arbitrary, as described above. Alternatively, the local datum characteristic 436 can be a characteristic identifiable in the code portion 440. In the embodiment shown in FIG. 5, each local datum characteristic 436 is spaced from the adjacent local datum characteristic 436 by a distance $d_0$. In various exemplary embodiments, the distance do is chosen such that there is always at least one local datum characteristic 436 within the detection window 460.

In various exemplary embodiments the individual code elements, shown in the various code element sub-zones 451 in FIG. 5, include first code elements that are of the darker type of scale elements in the image produced on the light detector 160 and second code elements that are of the brighter type of scale elements in the image produced on the light detector 160. In particular, if the first "darker-image" code elements are decoded as a binary 1, then the second "brighter-image" code elements are decoded as binary 0. Thus, the pattern of individual code elements in each code portion 440 forms a binary number or code word that can be decoded to identify the measurement value of the local datum point characteristic 436 and, thus, the location of detection window 460 and the readhead 126, to the first resolution.

The periodic portions 420 each include first incremental scale elements 426 that each have the same extent along the measuring axis direction 112 and that are separated from each other by second incremental scale elements 429. The second incremental scale elements 429 each have the same extent along the measuring axis direction 112. Each contiguous pair of first and second incremental scale elements 426 and 429 spans one unit of the incremental pitch p. As shown in FIG. 5 and discussed in detail with reference to FIG. 6, in various exemplary embodiments, the second incremental scale elements 429 are of the brighter type of scale elements in the image produced on the on the light detector 160 and are narrower along the measuring axis direction 112 than the first incremental scale elements 426, which are of the darker type of scale elements in the image produced on the on the light detector 160. However, in various other exemplary embodiments, the extents of the second incremental scale elements 429 are equal to or greater than the extents of the first incremental scale elements 426.

The exemplary embodiment shown in FIG. 5, as previously described, includes predetermined portions 430 adjacent to each upper and lower end of each of the code portions 440. Each predetermined pattern portion 430 includes a predetermined portion scale element 432 that, in the exemplary embodiment shown in FIG. 5, has a location and a dimension along the measuring axis direction 112 that are the same as the location and dimension of the adjacent code zone 450 along the measuring axis direction 112. As shown in FIG. 5, each of the exemplary predetermined portions 430 includes identical predetermined portion scale elements 432 regardless of the position of their respective coded segments 310 along the measuring axis direction 112 of the scale 110. It should also be appreciated that the exemplary predetermined portions 430 along the lower portion of the scale track 400 are an inverted "mirror image" of the exemplary predetermined portions 430 along the lower portion of the scale track 400, which provides a redundancy and a symmetry that is useful in various installation and/or alignment procedures, and/or in various signal processing schemes that allow the scale to be installed in an inverted orientation relative to the readhead 126. It should be appreciated that the function of these predetermined portions 430 is primarily to enable the signal processing that searches for a code portion 440 and the individual code elements included in the detection window 460 to be simple, fast and robust.

For example, in the embodiment shown in FIG. 5, the predetermined portion scale elements 432 are of the "brighter type" or brighter-image scale elements in the image produced on the on the light detector 160 and have a unique width that is wider along the measuring axis direction 112 than the brighter type of scale elements in the periodic portions 420. Each predetermined portion scale element 432 is bounded on the left and right along the measuring axis direction 112 by contrasting adjacent scale elements that are of the "darker type" or darker-image scale elements in the image produced on the light detector 160, which similarly have a unique width that is wider along the measuring axis direction 112 than the darker image type of scale elements in the periodic portions 420. In various exemplary embodiments, the readhead 126 is mounted and guided relative to the scale 110 to insure that the detector window 460 always includes at least a portion of at least the upper predetermined portion scale elements 432. In particular, the line 463 in FIG. 5 is indicative of a predetermined row 463 of pixels, or a small number of predetermined rows 463 of pixels, of the light detector 160 that are near the upper edge of the detector window 460. It is insured that these rows of pixels extend through the upper predetermined portion scale elements 432. Thus, by analyzing the image data along the predetermined row 463, at any position of the detector window 460 along the integrated scale track 400 of scale 110, the location of a predetermined portion scale element 432 is easily distinguished due to the associated unique width(s).

Thus, without the need for further or more complicated searching or analysis, a center column 464 of pixels, or a small number of center columns 464 of pixels, coinciding with the center of the predetermined portion scale element 432, is easily located. The line 464 in FIG. 5 is indicative of the center column 464 is. Thus, it is further known by design that a specific number of code element sub-zones 451, located a predetermined distance below the bottom edge of the predetermined portion scale element 432 along the center column 464, contain the unique code that corresponds to the measurement value of the local datum and/or local datum characteristic 436. As previously mentioned, in various other exemplary embodiments, the predetermined portions 430 use various alternative patterns to that shown in FIG. 5, that similarly complement various alternative signal-processing methods.

In the exemplary embodiment shown in FIG. 5, the edge of a predetermined portion scale element 432 that is closest to a code region 450 along the center column 464 is defined by its boundary with a predetermined spacer element 454. Adjacent to the spacer elements 454, along the direction perpendicular to the measuring axis direction 112, are the code regions 450, which contain unique codes defined by the binary bit values corresponding to the seventeen individual code elements in the seventeen code element sub-zones 451 included within each code region 450.

In one exemplary embodiment of the integrated scale track 400, along the measuring axis direction 112: the darker-image first incremental scale elements 426 each have an extent of 25 $\mu$m and the brighter-image second incremental scale elements 429 each have an extent of 15 $\mu$m—corresponding to an incremental pitch p of 40 $\mu$m; the predetermined portion scale elements 432, the code zones 450, and the code element sub-zones 451 each have an extent of 35 $\mu$m; the contrasting adjacent scale elements that bound each predetermined portion scale element 432 and code zone 450 on the left and right have an extent of 40 $\mu$m; and $d_0$ is 280 $\mu$m, which is seven times the incremental pitch. Perpendicular to the measuring axis direction 112 the integrated scale track width 470 is a little more that 0.5 mm, and each code element sub-zone 451 and each spacer element 454 has an extent of 15 $\mu$m.

The detection window 460 corresponds to a light detector 160 having approximately 352 pixels along the row dimension 468 corresponding to the measuring axis direction 112 and approximately 288 pixels along the column dimension 469 corresponding to the orthogonal direction, such that a 5 $\mu$m region on the scale 110 projects an image corresponding to approximately 4.4 pixels on the light detector 160. Thus, the 17-bit codes arranged in the code zone 450 allow an absolute range of nearly 37 meters. It should be appreciated that in this exemplary embodiment, a relatively large proportion of the area of the integrated scale track 400 is used for the periodic portion 420, enhancing the speed and accuracy of high-resolution position determination, as described above. The inventors have achieved reliable sub-micrometer measurements using comparable scale parameters and a compact readhead. Thus, compact and practical absolute position measurement devices according to the principles of this invention provide a remarkable combination of high resolution and absolute measurement range.

Furthermore, when sequential binary numbers are provided in the spatially sequential 17-bit codes arranged in the spatially sequential code segments 410 along the scale 110, as shown in FIG. 5, they may directly indicate the measurement value of the local datum. This eliminates the need for pseudo-random codes and the like and the associated memory circuits, lookup tables and associated signal processing. Thus, the inventors have found that the signal processing systems associated with integrated scale tracks including sequential binary numbers is generally significantly faster and more economical than those including pseudo random coding and the like, especially for longer measurement ranges requiring a larger number of codes and especially when the signal processing includes the numerical processing capability of a DSP.

Regarding the configuration shown in FIG. 5, it should be appreciated that the relatively longer extent of the darker-image first incremental scale elements 426 along the measuring axis, as well as the orientation of the code element boundaries 452 parallel to the measuring axis direction 112—which is also the direction of relative motion between the readhead 126 and the integrated scale track 400 of the scale 110—facilitates robust operation and provides a number of advantages during high speed motion. Such design considerations related to high-speed motion are discussed below with reference to FIG. 6.

It should be further appreciated that the relatively large individual code elements included in the relatively large individual code element sub-zones 451 are adequately visible despite contamination, defects, and static and dynamic variations in the gap between the scale 110 and readhead 126, but small enough to allow a long absolute range by providing a large number of bits in a small proportion of the scale length/area, so that more of the scale length/area can be dedicated to the information in the periodic portions 420 that enhances the high-resolution position determination. It should be appreciated that in various other exemplary embodiments the extents of various elements can be decreased substantially, depending on the various operating conditions expected in various applications of a readhead and scale according to this invention.

It should also be appreciated that it is particularly easy and economical to fabricate scales including integrated scale tracks according to this invention, because only the periodic portions 420 require the accurate placement and fabrication commensurate with the desired overall scale accuracy. For example, using the photo-resist exposure methods often used for conventional high accuracy incremental scales, each of the first incremental scale elements 426 and second incremental scale elements 429 can be defined using known and highly accurate continuous step and repeat exposure procedures. Alternatively, a relatively long mask fabricated by such a procedure can be used. In either case, elements within the code portions 440 receive no exposure or are not processed during this initial fabrication phase.

Then, since the code portions 440 according to this invention do not require particularly accurate location and fabrication, the unique patterns of the code portions 440 can be exposed later using a programmable high-speed scanning laser exposure system or the like. It should be appreciated that the most accurate operations are thus simplified and made more economical and accurate, while the accuracy of the unique coding operations is relaxed in order that they may be made more flexible,-fast and economical.

In operation, an image of the scale 400 is captured corresponding to the detection window 460 shown in FIG. 5. This image is then analyzed to identify the predetermined portion 430 that appears in the detection window 460. Because the structure of the scale track 400 is known a priori, once the predetermined portion 430 is located, the code portion is known to occur in a direction perpendicular to the measuring axis direction 112 from the predetermined portion 430, as previously described. The pattern and extents of the bright and dark portions of the captured image, corresponding to the individual code elements in code element sub-zones 451 included within each code region 450, is determined to extract the code word defined by these patterns and extents.

Then, the extracted code word either is used as an address entry into a look-up table or is used as a variable in a formula to determine the measurement value of the local datum and/or local datum characteristic 436, and, thus, the location of the detection window 460 and the readhead 126 relative to the scale 110 to a first resolution approximately corresponding to the spacing of the local datum characteristics 436 and/or the code portions 440. In various exemplary embodiments, a given feature of the periodic portion 420 appearing in the detection window 460 near the code portion 440 serves as a local datum characteristic 436.

To further refine the absolute position measurement resolution, it is convenient and sufficient to find the location of the local datum point characteristic 436 relative to a left edge 462, or a right edge, of the detection window 460. When the left edge 462 of the detection window 460 is used as the reference point relative to the left local datum point characteristic 436, as shown in FIG. 5, the number of pixels corresponding to the offset distance $d_1$ is easily determined to within one or a few pixels, and this pixel distance may be converted to the actual offset distance $d_1$ based on the known geometric characteristics of the light detector 160 and the magnification of the readhead 126.

When the offset distance $d_1$ is added to the measurement value of the local datum characteristic 436 as indicated by the associated code elements, the absolute position of the readhead 126 relative to the scale 110 is known to a second resolution, which is finer than one-half the incremental pitch of the periodic portion 420, and approximately corresponding to one or a few times the pixel pitch, divided by the magnification of the readhead 126. It should be appreciated that, in general, the offset distance $d_1$ can be defined based on either the right hand edge or the left hand edge 462 of the detector window 460 in correspondence with the associated signal processing.

It should be appreciated that the relatively lower resolution position determining operations described above have so far used relatively little of the position information available in the detection window 460. To further refine the absolute position measurement between the readhead 126 and the scale 110, it is desirable to use more of the information in the detection window 460, so that the effects of local fabrication inaccuracies, defects, contamination and the like are averaged out to provide a better signal to noise ratio and a more accurate position determination. In particular, it is desirable to make a position determination based on some or all of the information and/or signals arising from the periodic portions 420 present in the detection window 460. In effect, the goal is to refine the estimate of the previously described offset distance $d_1$.

Figure 9:
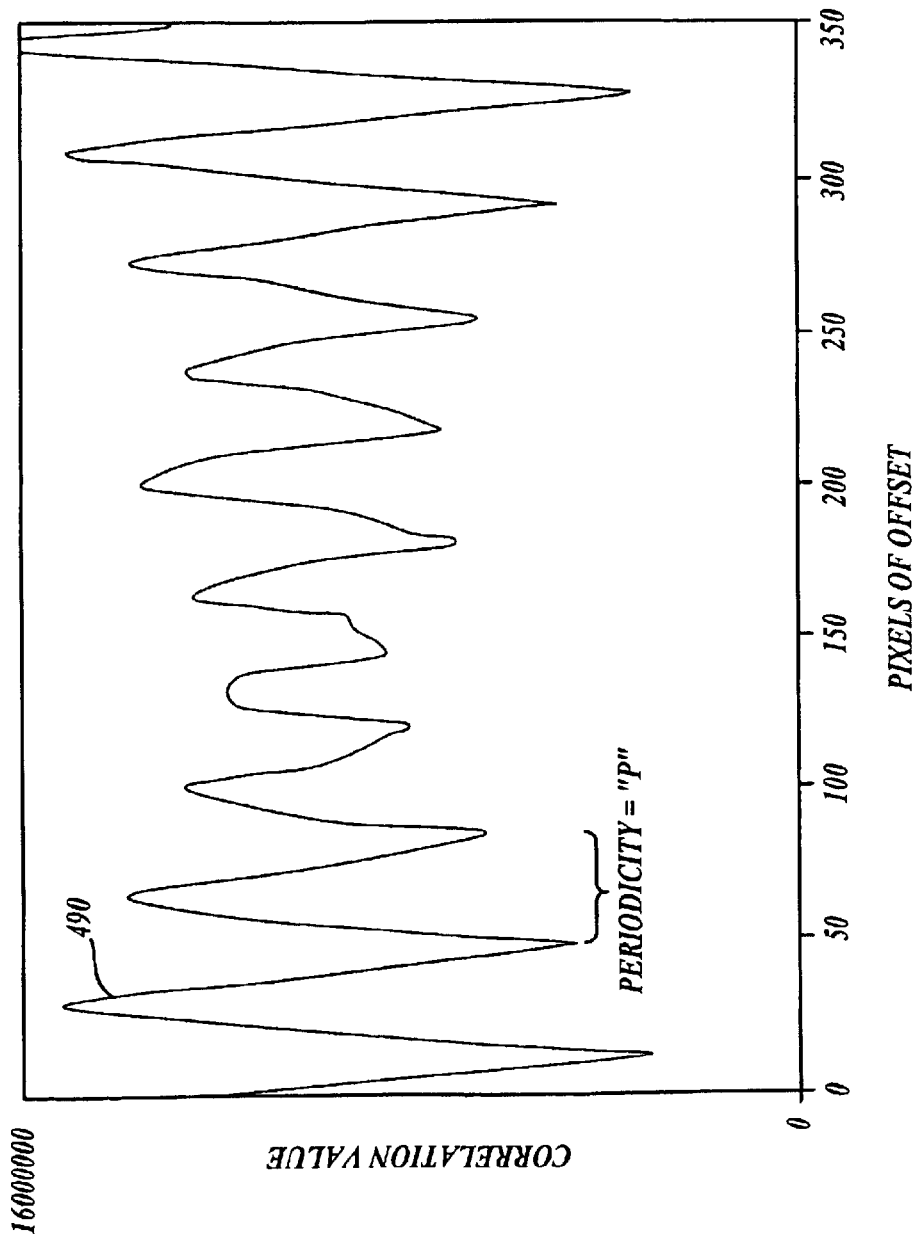
FIG. 9 is a graph illustrating the correlation function result for a periodic current image and a reference image.

In various exemplary embodiments, at least a portion of a correlation function, such as that shown in FIG. 9, is generated by comparing the captured image corresponding to the detection window 460 to a reference image selected to match the structure of the first incremental scale elements 426 and second incremental scale elements 429 in the periodic portions 420. The reference image can be an actual image obtained from the scale 110 or can be a synthetic image. The only requirement for the reference image is that the reference image has a periodic portion corresponding to the structure of the periodic portion 420 of sufficient size to allow an adequate correlation curve to be generated. For example, in various exemplary embodiments, the reference image may be shorter along the measuring axis direction than the complete detected images of the scale 110, such that it may include only the number of consecutive periodically placed first incremental scale elements 426 and second incremental scale elements 429 guaranteed to occur consecutively in every detected image of the scale 110.

It should be appreciated that, in various other exemplary embodiments, if a synthetic image is used, the synthetic image may include only the structure of the first incremental scale elements 426 and second incremental scale elements 429 of the periodic portion 420, but extending across the full length of the synthetic image. Alternatively, the synthetic image can include a periodic portion 420, the predetermined portion 430 and a representative code portion 440. Similarly, a reference image obtained from the scale 110 itself will generally include the periodic portion 420, the predetermined portion 430 and one of the code portions 440. However, it should be appreciated that any of these types of reference images can have an appropriate section of the image corresponding to the location of the code portion(s) 440 "edited out", or skipped during the correlation operations. For a real reference image, the location of the code portion 440 can be determined, for example, based on any of the various the code portion locating methods described above.

It should also be appreciated that, if the readhead 126 is mounted with a yaw misalignment relative to the scale 110, the actual images from the scale 100 will be rotated relative to an ideally aligned reference image of the scale 110. However, in general, such a limited image rotation due to reasonably expected yaw misalignments will be consistent regardless of the position of the readhead 126 along the scale 110. Therefore, such image rotations will create an error that is approximately the same at each position and therefore can be ignored in various exemplary embodiments. In various other exemplary embodiments, the amount of rotational misalignment between an actual image and an ideally aligned reference image is determined, during a calibration procedure, using any known or later-developed rotational correlation method, or the like. The reference or actual images are then computationally rotated into alignment, prior to or during the signal processing that occurs during normal operation, to enhance the accuracy of correlation operations and the accuracy of position determinations. In yet other exemplary embodiments, the reference image is derived from an actual image including the consistent rotational misalignment. In this case, the reference image is inherently rotationally aligned with the subsequent actual images.

In any case, it should be appreciated that the initial estimate of the offset distance $d_1$, according to the operations described above, is certainly accurate to better than one-half of an incremental pitch increment. Accordingly, the offset position determination based on some or all of the information and/or signals arising from the periodic portions 420 present in the detection window 460, is used to refine or replace the estimate of the previously described offset distance $d_1$, such that an accuracy and/or resolution better than one-half of an incremental pitch increment is provided. Various applicable methods based on correlation operations are discussed further below, with reference to FIG. 9.

Figure 6:
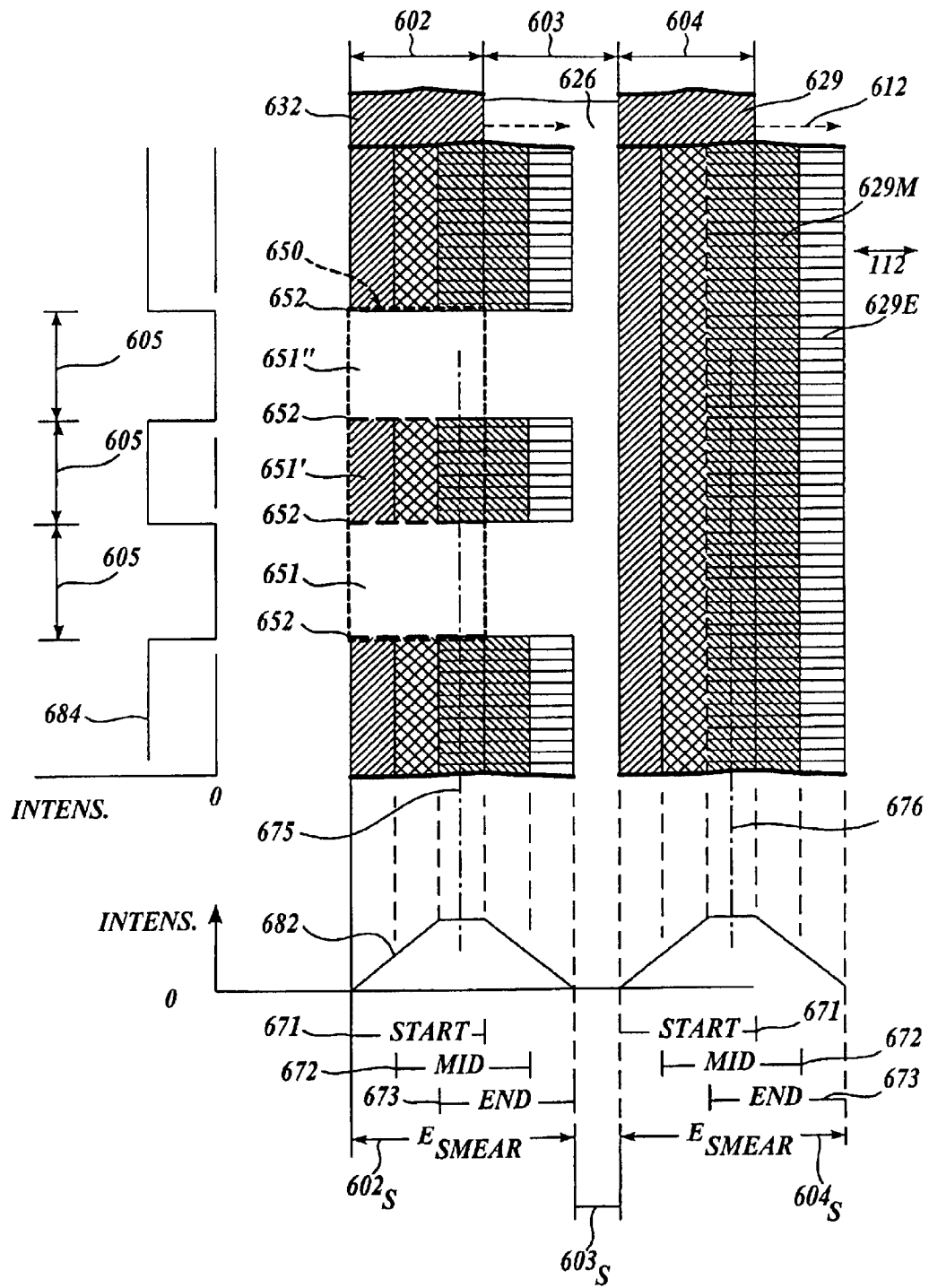
FIG. 6 is a diagram illustrating various considerations related to image smearing during relative motion between a readhead and an absolute scale according to this invention.

FIG. 6 is a diagram illustrating various considerations related to image smearing during relative motion between a readhead and an absolute scale according to this invention. FIG. 6 schematically represents an image created on the array 166 of the light detector 160 during an exposure time of the image a scale track 300, 300", or the like, when the readhead 126 is moving along the measuring axis direction 112 relative to the scale 110. In particular, to simplify the following discussion, it is assumed that the various elements on the scale 110 are not magnified in the image on the light detector 160 and that the relative motion velocity is constant during the exposure time. The phrase "nominal extent" in the following discussion of FIG. 6 refers to the nominal extents of various elements as fabricated on the scale 110, or, equivalently, to the nominal extents of various elements in an image without relative motion.

For the purpose of explanation, FIG. 6 schematically shows portions of various simplified elements analogous to similarly referred-to elements previously discussed with reference to FIG. 5. FIG. 6 shows a schematic image of a brighter-image type predetermined portion scale element 632 having a nominal extent 602, a darker-image type incremental scale element 626 having a nominal extent 603, and a brighter-image type incremental scale element 629 having a nominal extent 604. Also shown is a nominal code region 650 having the nominal extent 602 along the measuring axis direction 112. The code region 650 includes individual code element sub-zones 651, 651' and 651", each having nominal code element boundaries 652, and each having an extent 605 perpendicular to the measuring axis direction 112. The individual code element sub-zones 651, 651' and 651" should also be understood to indicate the presence of respective code elements that are represented by the same reference numbers.

In the following discussion, for the purpose of explanation, it is assumed that any darker-image type scale element produces no image intensity, or an insignificant image intensity, on the light detector 160. At the start of an exposure time of the image shown in FIG. 6, the starting positions of the scale elements 632, 629 and 651–651" are indicated by the start position indicators 671. The starting "unshifted" images of various scale elements are shown by a first type of shading in FIG. 6.

At a time midway through the exposure time of the image shown in FIG. 6, the "midway" positions of the scale elements 632, 629 and 651–651" are indicated by the midway position indicators 672. Correspondingly-shifted images of various scale elements are shown by a second type of shading in FIG. 6.

At the end of the exposure time of the image shown in FIG. 6, the "end" positions of the scale elements 632, 629 and 651–651" are indicated by the end position indicators 673. Correspondingly-shifted images of various scale elements are shown by a third type of shading in FIG. 6.

As shown in FIG. 6, during the exposure time the image of the brighter-image type elements are smeared along the smear direction 612, which is nominally parallel to the measuring axis direction 112. For example, the scale elements 632 and 651" has the relatively increased smeared extent $602_S$, and the scale element 629 has the relatively increased smeared extent $604_S$, in the image exposed during relative motion. Furthermore, the apparent extent of the darker-image type scale element 626 has been reduced to the smeared extent $603_S$, which is significantly decreased relative to the nominal extent 603 of the darker-image type scale element 626. The intensity profile line 682 indicates the relative intensity values that occur along a row of pixels of the light detector 160 for the image shown in FIG. 6.

It should be appreciated from the foregoing discussion that, in the extreme case, for any combination of relatively longer exposure times, relatively faster motion, and relatively smaller nominal extents of the darker-image type scale elements such as the scale element 626, the darker-image type scale elements will "disappear", or otherwise become significantly obscured and unusable in the exposed image on the light detector 160. For example, for an exposure time of 40 microseconds, darker-image type scale elements having nominal extents of less than approximately 40 microns will "disappear" at motion speeds of approximately 1 meter per second or more. As a further example, for an exposure time of 20 microseconds, darker-image type scale elements having nominal extents of less than approximately 40 microns will "disappear" at motion speeds of approximately 2 meters per second or more, and so on. Thus, it should be appreciated that in various exemplary embodiments according to this invention, at least in the periodic portions 320, 420, and the like, the darker-image type scale elements have a greater extent along the measuring axis direction than the brighter-image type scale elements. Such greater extents tend to reduce this problem for a given incremental pitch p, allowing longer exposure periods and/ or higher allowable motion speeds, if desired. In any case, in various exemplary embodiments, the darker-image type scale elements have an extent along the measuring axis direction 112 that is sufficient to prevent their "disappearance" for reasonably expected operating speeds and exposure times.

Regarding the apparently increased smeared extents of the brighter-image type scale elements described above, it should be appreciated that for any exposure time period and any motion speed, assuming approximately constant velocity during the time period, the mid-line of the smeared extent of a brighter-image type scale element such as the midline 675 of the scale element 632, or the midline 676 of the scale element 629, will always have the appropriate position value along the measuring axis that should be associated with the time that is midway through the exposure period. The midlines 675 and 676 are easily determined, from the intensity profile 682, for example. Thus, these particular times and position values are used to govern various signal processing operations, position determinations, and/or position output operations in various exemplary embodiments according to this invention.

For example, in various exemplary embodiments that perform correlations operations as described further below, the brighter-image type scale elements in at least the periodic portions 320, or 420, or the like, are synthetically dilated in the reference image or synthetically contracted in the actual image, about their midlines along the measuring axis direction 112. In various exemplary embodiments, this is done such that the extents of at least the brighter-image type scale elements approximately match between the reference and actual images or detection hardware. It should be appreciated that according to the foregoing discussion, this operation does not change the associated midline positions or position timing associated with a particular correlation operation. Thus, in various exemplary embodiments, this simplifies or speeds up the correlation operations and/or increases their robustness or accuracy.

In contrast to the image smear that occurs along the measuring axis direction 112 during relative motion, as shown in FIG. 6 by the code element sub-zone extents 605, the associated image features and the intensity profile 684, no image smear occurs along the direction perpendicular to the measuring axis direction 112, that is, perpendicular to the direction of relative motion. The intensity profile 684 indicates the relative intensity values that occur along a column of pixels of the light detector 160 for the image shown in FIG. 6. In contrast to intensity profiles along the measuring axis direction during relative motion, along the intensity profile 684 that extends perpendicular to the measuring axis direction 112, the sequence of code values of the code elements 651–651' are easily determined from the distinct values and/or abrupt transitions that occur at known and predictable locations and/or intervals. It should be appreciated that the various values and/or transitions that occur at known and predictable locations and/or intervals are most distinct when the intensity profile is determined along a column of pixels that corresponds to the midline 675, which further corresponds to the peak of the intensity profile 682. Thus, regardless of motion speeds or exposure times, the image extents and locations of the various code elements 651–651" along the direction perpendicular to the measuring axis direction 112 are known and predictable for any particular embodiment of an integrated scale track 300, 300', or the like, according to this invention.

Furthermore, since the image extents of various code elements along the direction perpendicular to the measuring axis direction 112 are not sensitive to motion speeds or exposure times, in various exemplary embodiments, the extents of the code elements along the direction perpendicular to the measuring axis direction 112 are made less than the permissible extents of various incremental scale elements along the measuring axis direction 112. It should be appreciated that this relatively reduced sizing of the extents the code elements along the direction perpendicular to the measuring axis direction 112 provides a desired number of code elements in a relatively small area according to the principles of this invention. In turn, this allows relatively more area to be allocated to the incremental scale elements that are used for the highest resolution position determination according to the principles of this invention. It should be appreciated that this is a one major feature and benefit of an integrated scale track according to the principles of this invention.

It should be appreciated that in order to increase the ultimate accuracy and resolution of a readhead 126 and scale 110 according to this invention, it is one particular object of this invention to maximize the proportion of the periodic portions 320, 420, or the like, in the integrated scale track 300, 300', or the like. Software or hardware based correlation operations according to this invention can achieve increased accuracy and resolution when a greater proportion of the scale track, and thus of each correlation image, matches the predictable periodic pattern of a reference image or the predictable periodic pattern of a hardware-based correlation detector.

Accordingly, in various exemplary embodiments according to this invention, one objective is to provide an arrangement of code elements that provides a desired number of code bits in the smallest reliably usable portion of the integrated scale track 300, 300', or the like. It should be appreciated from the discussion and description outlined above that:

This objective is achieved to a first degree in various exemplary embodiments where a plurality of code element in an integrated scale track according to this invention are arranged and detectable along a respective line extending perpendicular to the expected motion axis, or measuring axis of the integrated scale track 300, 300', or the like. It should be appreciated that as shown in FIG. 6, this allows the plurality of code elements to be free of motion-related smear effects along that respective line, and thus to have relatively reduced extents and/or allow more robust detection along that line.

This objective is achieved to a further degree in various exemplary embodiments where all of the code elements in an integrated scale track according to this invention are arranged and detectable along a respective line extending perpendicular to the expected motion axis.

This objective is achieved to a further degree in various exemplary embodiments where each of a plurality of code elements in an integrated scale track according to this invention are arranged to share at least one mutual border with an adjacent code element located along a respective line extending perpendicular to the expected motion axis.

It should be further appreciated that to the extent than any individual code element coincides with both the location and the brighter-image or darker image type of a periodically placed incremental scale element, that code element can also properly act as a correlatable feature of a periodic portion according to this invention. Thus, in effect, such code elements further maximize the proportion of the periodic portions in an integrated scale track according to this invention. That is, stated another way, at least some of the previously discussed objectives are achieved to a further degree in various exemplary embodiments where a plurality of the code elements in an integrated scale track according to this invention are embedded within and coincide with both the location and extent along the measuring axis direction of a periodically placed incremental scale element and such elements are arranged and detectable along a respective line extending perpendicular to the expected motion axis. Such an embodiment is described with reference to FIG. 7, below.

Figure 7:
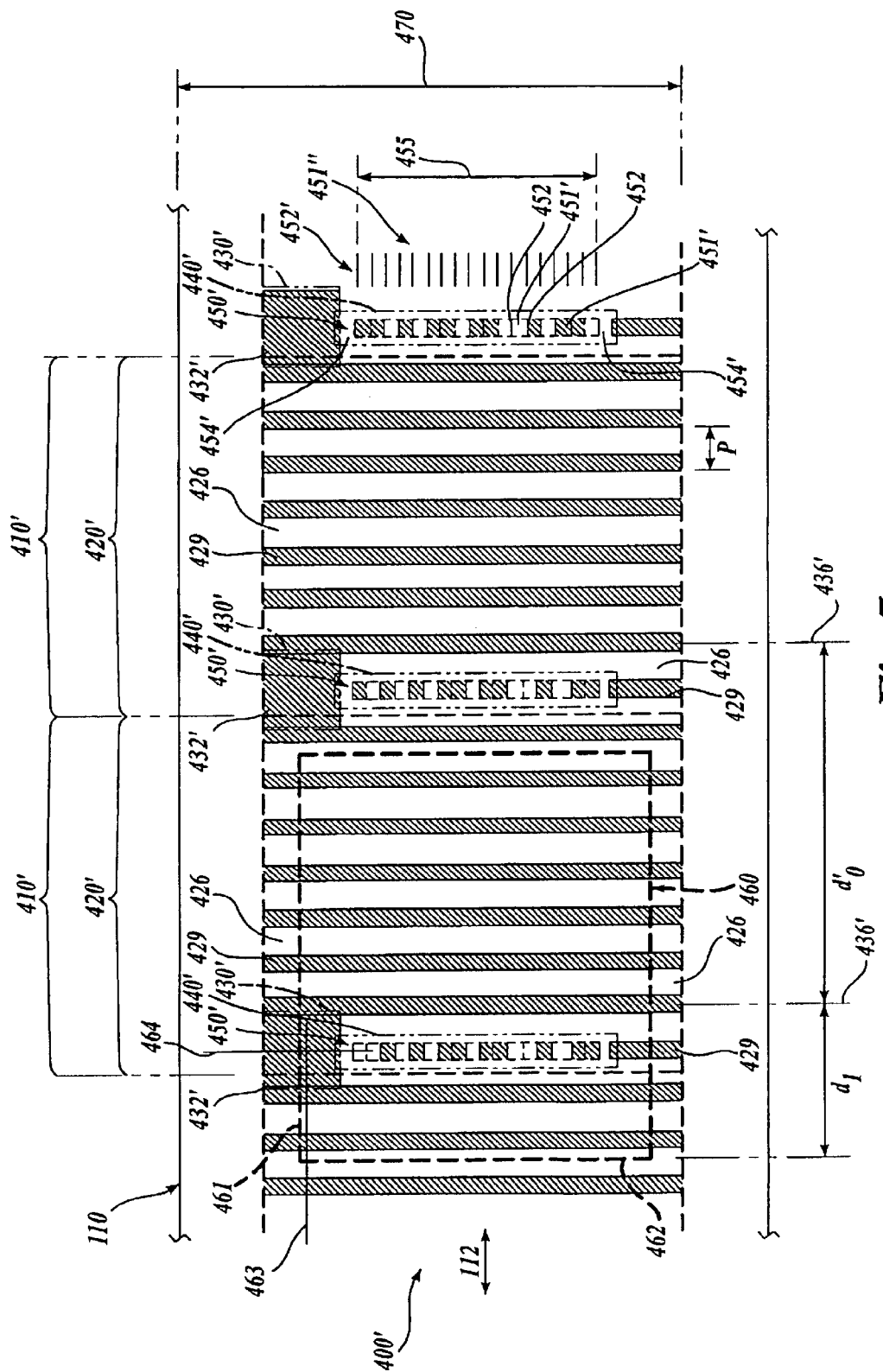
FIG. 7 illustrates a portion of a second specific exemplary embodiment of an integrated scale track according to this invention, which is a second specific exemplary embodiment of the generic integrated absolute scale shown in FIG. 3.

FIG. 7 illustrates a portion of a second specific exemplary embodiment of an integrated scale track 400' according to this invention, which is a second specific exemplary embodiment of the generic integrated absolute scale 300' shown in FIG. 3. In FIG. 7, elements numbered similarly to elements shown in FIG. 5 are arranged and function similarly to the corresponding elements discussed with reference to FIG. 5, unless otherwise indicated or apparent in the following discussion.

FIG. 7 shows the scale 110, a detection window 460 and a second specific exemplary embodiment of an integrated absolute scale track 400' corresponding to the integrated scale track 300' shown in FIG. 3. The readhead 126 moves relative to the integrated scale track 400' along the measuring axis direction 112. As shown in FIG. 7, the integrated absolute scale track 400' includes a plurality of coded segments 410' that repeat along the entire length of the scale 110. Each coded segment 410' includes a code portion 440' and a periodic portion 420' arranged along the measuring axis direction 112. Each coded segment 410' also includes predetermined pattern portions 430' that are located adjacent to the upper end of each of the code portions 440'.

The code portions 440' each include a code element zone 450' that is located along the measuring axis direction 112 of the scale 110 and that extends along a direction perpendicular to the measuring axis direction 112. It should be appreciated that in various exemplary embodiments of the integrated scale track 400', the location and extent of each code element zone 450' along the measuring axis direction 112 is congruent with the nominal location and extent of a hypothetical periodically-placed second incremental scale element 429 along the measuring axis direction 112. That is, each code element zone 450' is sized and located along the measuring axis direction 112 as if it were a second incremental scale element 429 of the periodic portion 420.

Each code element zone 450' is divided into a plurality of individual code element sub-zones 451', as generally marked in FIG. 7 by indicator spaces 451" included in the span 455. The code element sub-zones 451' are separated by a plurality of nominal code element boundaries 452, as generally marked in FIG. 7 by indictor lines 452' included in the span 455, which coincide with the boundaries or transitions between individual code elements that are located in the individual code element sub-zones 451'. Optionally, spacer elements 454' are located at the upper and lower end of each code element zone 450'.

As shown in FIG. 7, individual code elements are present or absent in each individual code element sub-zone 451' to provide a distinct and/or unique pattern of code elements in each code portion 440', as described with reference to the first and second exemplary embodiments 300' and 300", above. The extents of the individual code elements along the measuring axis direction 112 coincide with the extents of the code element zone 450' along the measuring axis direction 112. It should be appreciated that the extents of the individual code elements perpendicular to the measuring axis direction 112 coincide with the nominal code element boundaries 452, even in various code embodiments where they are touching and exhibit no distinguishable physical boundary or image edge transition between the individual code elements. In various exemplary embodiments, the extents of the individual code elements perpendicular to the measuring axis direction 112 are less than their extents along the measuring axis direction 112, such that a relatively large number of code elements can be provided in a relatively small proportion of the area of each coded segment 410'. In the embodiment shown in FIG. 7, the extents of each individual code element are conveniently made the same.

The pattern of individual code elements in each code portion 440' forms a binary number or code word that can be decoded to identify the measurement value associated with a local datum and/or local datum characteristic 436' and, thus, the location of the detection window 460 and the readhead 126, to the first resolution. In the exemplary embodiment shown in FIG. 7, the local datum characteristic 436' is conveniently chosen as the center of a periodically placed incremental scale element 429 that is immediately adjacent to the right of the code portion 440'. In the embodiment shown in FIG. 7, each local datum characteristic 436' is spaced from the adjacent local datum characteristic 436' by a distance $d'_0$. In various exemplary embodiments, the distance $d'_0$ is chosen such that there is always at least one local datum characteristic 436' within the detection window 460.

The periodic portions 420' each include darker-image type first incremental scale elements 426 and brighter-image type second incremental scale elements 429. Each contiguous pair of first and second incremental scale elements 426 and 429 spans one unit of the incremental pitch p. In the exemplary embodiment shown in FIG. 7, the brighter-image type second incremental scale elements 429 are narrower along the measuring axis direction 112 than the darker-image type first incremental scale elements 426, for reasons previously explained with reference to FIG. 6. Due to the differences in the structure of the code portions 440' described above and the predetermined pattern portions 430' described below, in comparison to the periodic portions 420 of the previous exemplary embodiment of the integrated scale track 400, the periodic portions 420' of the present embodiment include additional second incremental scale elements 429. Thus, it should be appreciated that each periodic portions 420' of the present embodiment includes nominally the entire region of the corresponding coded segment 410', except in the minimal areas where the embedded elements of the code portions 440' and the predetermined pattern portions 430' contrast with the expected nominal pattern of the periodic portions 420'.

In contrast to the previous exemplary embodiment of the integrated scale track 400 shown in FIG. 5, this exemplary embodiment of the integrated scale track 400', includes predetermined portions 430' adjacent to only the upper end of each of the code portions 440'. Each predetermined pattern portion 430' includes a brighter-image type predetermined portion scale element 432' that has a dimension along the measuring axis direction 112 of approximately two times the pitch p, such that it bridges between two of the brighter-image type second incremental scale elements 429, to provide an associated unique continuous feature width. The line 463 in FIG. 7 is indicative of a predetermined row 463 of pixels, or a small number of predetermined rows 463 of pixels, of the light detector 160 that are near the upper edge of the detector window 460. The readhead 126 is mounted and guided relative to the scale 110 to insure that these rows of pixels extend through the predetermined portion scale elements 432'. By analyzing the image data along the predetermined row 463, at any position of the detector window 460 along the integrated scale track 400' of scale 110, the location of a predetermined portion scale element 432' is easily distinguished due to the associated unique continuous feature width, which is the only continuous feature width along the integrated scale track 400' that exceeds the dimension of the pitch p, for example.

Thus, when a complete predetermined portion scale element 432' is included in the detector window 160, a center column 464 of pixels, or a small number of center columns 464 of pixels, coinciding with the center of the predetermined portion scale element 432, is easily located without the need for more complicated searching or analysis. The line 464 in FIG. 7 is indicative of the center column 464 is. Similarly to the previous exemplary embodiment of the integrated scale track 400, in this exemplary embodiment of the integrated scale track 400' it is known by design that a specific number of code element sub-zones 451' are located a predetermined distance below the bottom edge of the predetermined portion scale element 432' along the center column 464. Thus, the code elements of the code portion 440' are easily located and decoded. When only an incomplete predetermined portion scale element 432' is included in the detector window 160, then the location of the one or two next-adjacent adjacent second incremental scale elements 429 can be identified in the image data along the predetermined row 463, and the location of the center column 464 of pixels can be inferred based on known design factors for the integrated scale track 400'.

In one exemplary embodiments of the integrated scale track 400', various features are the same as previously described with reference to one exemplary embodiment of the integrated scale track 400. These features include the first incremental scale elements 426, the second incremental scale elements 429, the incremental pitch p, the detection window 460 and the associated pixels and their relation to dimensions on the scale 110, the span 455 and the included extents of the individual code element sub-zones 451' perpendicular to the measuring axis direction 112, and the integrated scale track width 470. Since each code element zone 450' is sized and located along the measuring axis direction 112 as if it were a second incremental scale element 429 of the periodic portion 420', other dimensions of the code element zones 450' and the individual code element sub-zones 451' can be inferred from this information.

It should be appreciated that in various exemplary embodiments of the integrated scale track 400' the code elements are embedded within and coincide with both the location and extent along the measuring axis direction of a hypothetical periodically placed incremental scale element. Various associated differences in the structure of the code portions 440', the predetermined pattern portions 430' and the periodic portions 420', are described above. As a result of these differences, the dimension $d_0$ between the adjacent local datum characteristics 436' in the adjacent coded segments 410' can be increased to eight times incremental pitch, that is, 320 μm in the present embodiment. Thus, the 17-bit codes arranged in the code zone 450' allow an absolute range of nearly 42 meters while taking up less than 15% of the integrated scale track 400', along with their adjacent predetermined portion scale elements. Accordingly, in this exemplary embodiment, at least 85% of the area of the integrated scale track 400' can be used for the periodic portion 420', further enhancing the speed and accuracy of high-resolution position determination based on a periodic portions according to the principles of this invention, as described above.

Figure 8:
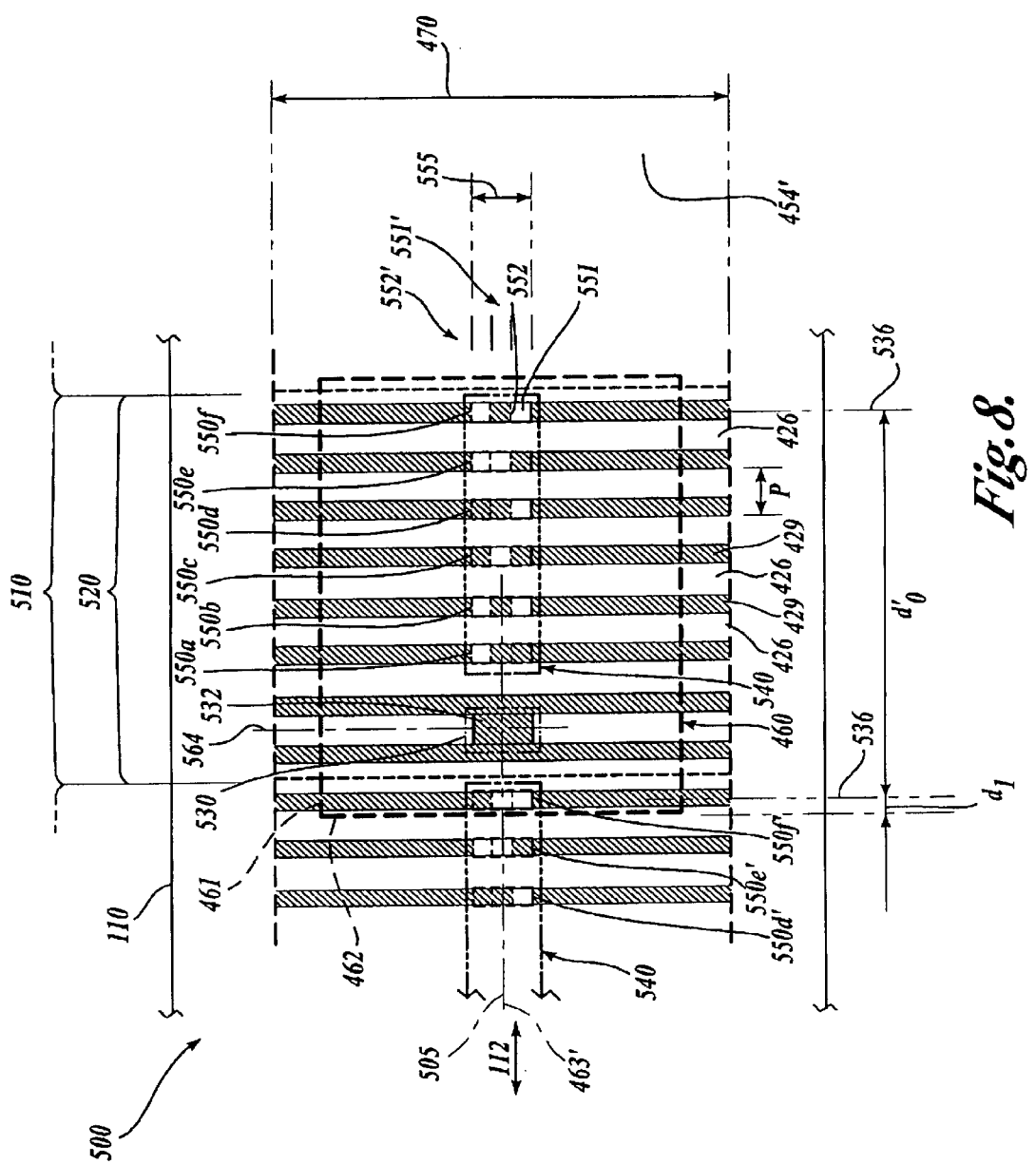
FIG. 8 illustrates a portion of a third specific exemplary embodiment of an integrated scale track according to this invention, which is a first specific exemplary embodiment of the generic integrated absolute scale shown in FIG. 4.

FIG. 8 illustrates a portion of a third specific exemplary embodiment of an integrated scale track 500 according to this invention, which is a first specific exemplary embodiment of the generic integrated absolute scale 300" shown in FIG. 4. In FIG. 8, elements numbered similarly to elements shown in FIG. 7 are arranged and function similarly to the corresponding elements discussed with reference to FIG. 7, unless otherwise indicated or apparent in the following discussion. In comparison to the second specific embodiment of an integrated scale track 400' shown in FIG. 7, the significant differences in the third specific embodiment of an integrated scale track 500 shown in FIG. 8 are the different configurations of the code portions 540 and the predetermined portions 530.

FIG. 8 shows the scale 110, a detection window 460 and the third specific exemplary embodiment of an integrated absolute scale track 500. The readhead 126 moves relative to the integrated scale track 500 along the measuring axis direction 112. As shown in FIG. 8, the integrated absolute scale track 500 includes a plurality of coded segments 510 that repeat along the entire length of the scale 110. Each coded segment 510 includes a code portion 540 arranged along a centerline 505 of the integrated scale track 500, and a periodic portion 520 arranged along the measuring axis direction 112. Each coded segment 510 also includes a predetermined pattern portion 530 that is arranged along the centerline 505 proximate to the code portion 540.

The code portions 540 each include a plurality of code element zones 550 that are located along the measuring axis direction 112 of the scale 110 and that extend a along a direction perpendicular to the measuring axis direction 112. It should be appreciated that in the embodiment of the integrated scale track 500 shown in FIG. 8, the location and extent of each code element zone 550 along the measuring axis direction 112 is congruent with the nominal location and extent of a periodically-placed second incremental scale element 429 along the measuring axis direction 112. That is, each code element zone 550 is sized and located along the measuring axis direction 112 as if it were a part of a second incremental scale element 429 of the periodic portion 520. In particular, in the exemplary embodiment shown in FIG. 8, each of the six code element zones 550A–550F included in the code portion 540 has a location and extent along the measuring axis direction 112 that is the same as the periodically-placed second incremental scale element 429 that extends perpendicular to the measuring axis direction 112 on each side of that code element zone 550. Various benefits associated with the general arrangement of code element zones exemplified in FIG. 8 are described further below.

It should be appreciated that in various other exemplary embodiments of an integrated scale track according to this invention, the location and extent of each code element zone 550 along the measuring axis direction 112 can instead be congruent with the nominal location and extent of a hypothetical periodically-placed first incremental scale element 426 along the measuring axis direction 112. Alternatively, various ones of code element zones 550 can be congruent with various ones of both the first and second incremental scale elements 426 and 429.

Each code element zone 550 is arranged in the span 555, which is near, or on, the centerline 505. Each code element zone 550 is divided into a plurality of individual code element sub-zones 551, as generally marked in FIG. 8 by indicator spaces 551' included in the span 555. The code element sub-zones 551 are separated by a plurality of nominal code element boundaries 552, as generally marked in FIG. 8 by indictor lines 552' included in the span 555, which coincide with the boundaries or transitions between individual code elements that are located in the individual code element sub-zones 551. In the specific embodiment shown in FIG. 8, each of the six code element zones 550A–550F includes 3 individual code element sub-zones 551 distributed along the direction perpendicular to the measuring axis direction 112, for a total of 18 individual code element sub-zones 551. Thus, in the exemplary embodiment shown in FIG. 8, each code element portion 550 can include 18 code elements to form an 18-bit code word.

As shown in FIG. 8, individual code elements are present or absent in each individual code element sub-zone 551 to provide a distinct and/or unique pattern of code elements in each code portion 540, which generally provide functions and benefits similar to those described above with reference to the first and second exemplary embodiments 300' and 300". The extents of the individual code elements along the measuring axis direction 112 coincide with the extents of the code element zone 550 along the measuring axis direction 112, which in this exemplary embodiment of the integrated scale track 500 coincides with the extents of the second incremental scale elements 429. It should be appreciated that the extents of the individual code elements perpendicular to the measuring axis direction 112 coincide with the nominal code element boundaries 552, even in various code embodiments where they are touching and exhibit no distinguishable physical boundary or image edge transition between the individual code elements. In various exemplary embodiments, the extents of the individual code elements perpendicular to the measuring axis direction 112 are less than their extents along the measuring axis direction 112, such that a relatively large number of code elements can be provided in a relatively small proportion of the area of each coded segment 510. In the embodiment shown in FIG. 8, the extents of each individual code element are conveniently made the same.

In one exemplary embodiment shown in FIG. 8, the pattern of individual code elements in each code portion 540 are arranged to form sequential binary numbers or code words in sequential coded segments 510 along the scale 110. That is, code element zone 550A includes the 3 most significant bits of a binary number or code word, code element zone 550B includes the 3 next most significant bits, and so on. Finally, the code element zone 550F includes the three least significant bits of the binary number or code word. Thus, it will be appreciated that regardless of the location of the detection window 460 along the scale 110, it will contain a combination of code element zones 550 that are easily combined to identify the appropriate sequential binary number or code word to be associated with that particular location of the detector window 460 and the readhead 126 along the scale 110.

It should be appreciated that in various exemplary embodiments, the detector window 460 may include "conflicting" or redundant code element zones, such as the code element zones 550F and 550F', shown in FIG. 8. Such "conflicts" or redundancies are easily resolved according to the known design of a particular embodiment of the integrated scale track 500 and/or by the appropriate corresponding signal processing. For example, in various exemplary embodiments, all conflicting or redundant code element zones 550 to the left of the predetermined portion 530 can be ignored, provided that all non-conflicting or non-redundant code element zones 550 to the left of the predetermined portion 530 are retained. It should be appreciated that in this case, the non-conflicting or non-redundant code element zones 550 retained to the left of the predetermined portion 530 will be the least significant bits of the appropriate code word.

In any case, the pattern of individual code elements in each code portion 540 forms a binary number or code word that can be decoded to identify the measurement value associated with a local datum and/or local datum characteristic 536 and, thus, the location of the detection window 460 and the readhead 126, to the first resolution. In the embodiment shown in FIG. 8, each local datum characteristic 536 is spaced from the adjacent local datum characteristic 536 by a distance $d'_0$. In various exemplary embodiments, the distance $d'_0$ is chosen such that there is always at least one local datum characteristic 536 within the detection window 460. In the exemplary embodiment shown in FIG. 8, the local datum characteristic 536 is conveniently chosen as the center of a periodically placed second incremental scale element 429 that is aligned with the code element zone 550 that is at the right end of the code portion 540. As described above, in various exemplary embodiments, the code element zone 550F that is at the right end of the code portion 540 includes the least significant bits of the code word included in the coded segment 510. Thus, in the exemplary embodiment shown in FIG. 8, when there are two local datums characteristic 536 in a detection window, the operational local datum for position determination is chosen to be the "retained" local datum, that is, the one associated with the retained LSB code element zone 550F.

The periodic portions 520 each include darker-image type first incremental scale elements 426 and brighter-image type second incremental scale elements 429. Each contiguous pair of first and second incremental scale elements 426 and 429 spans one unit of the incremental pitch p. Due to the differences in the structure of the code portions 540 described above and the predetermined pattern portions 530 described below, in comparison to the periodic portions 420 and 420' of the previous exemplary embodiments of the integrated scale track 400 and 400', the periodic portions 520 of the present embodiment include are uninterruptedly periodic along the measuring axis direction 112 everywhere in each coded segment 510, except where the coded portions 540 and the predetermined portions 530 are embedded in the periodic portion 520 along the measuring axis direction 112 over the span 555. Thus, it should be appreciated that each periodic portion 520 of the present embodiment includes nominally the entire region of the corresponding coded segment 510, except in the minimal areas along the span 555 where the embedded elements of the code portions 540 and the predetermined pattern portions 530 contrast with the expected nominal pattern of the periodic portions 520.

Various benefits associated with the general arrangement of the periodic portions and the embedded code portions 540 and predetermined portions 530, as exemplified in FIG. 8, are described further below.

In contrast to the previous exemplary embodiments of the integrated scale track 400 and 400', this exemplary embodiment of the integrated scale track 500 includes predetermined pattern portions 530 that are adjacent to each of the code portions 540 along the measuring axis direction 112, in the span 555. Each predetermined pattern portion 530 includes a brighter-image type predetermined portion scale element 532 that has a dimension along the measuring axis direction 112 of approximately one times the pitch p, such that it bridges between two of the brighter-image type second incremental scale elements 429, to provide an associated unique continuous feature width. The line 463 in FIG. 8 is indicative of a predetermined row 463 of pixels, or a small number of predetermined rows 463 of pixels, of the light detector 160 that are along the centerline of the detector window 460. The readhead 126 is mounted and guided relative to the scale 110 to insure that predetermined rows 463 of pixels extend through the predetermined portion scale elements 532.

In the exemplary embodiment shown in FIG. 8, the centerline of the predetermined portion scale elements 532 along the measuring axis direction 112 nominally coincides with the middle of the span 555, which coincides with the centerline 505 of the integrated scale track 500. Thus, in this exemplary embodiment, the predetermined rows 463 nominally coincide with the centerline 505. By analyzing the image data along the predetermined row 463, at any position of the detector window 460 along the integrated scale track 500 of the scale 110, the location of a predetermined portion scale element 532 is easily distinguished due to the associated unique continuous feature width, which is the only continuous feature width along the integrated scale track 500 that exceeds the dimension of the pitch p, for example.

Thus, when a complete predetermined portion scale element 532 is included in the detector window 160, a center column 564 of pixels, or a small number of center columns 564 of pixels; coinciding with the center of the predetermined portion scale element 532, is easily located without the need for more complicated searching or analysis. The line 564 in FIG. 8 is indicative of the center column 564. In this exemplary embodiment of the integrated scale track 500 it is known by design that a specific number of code element sub-zones 551 are located within the span 555 in a specific number of code element zone 550 that are located at specific steps along the measuring axis direction 112 relative to the center column 564 of the predetermined portion scale element 532. Thus, the code elements of the code portions 540 adjacent on either or both of the right and left sides of the predetermined portion scale element 532 are easily located and decoded.

In one exemplary embodiment of the integrated scale track 500, various features are the same as previously described with reference to one exemplary embodiment of the integrated scale track 400. These features include the first incremental scale elements 426, the second incremental scale elements 429, the incremental pitch p, the detection window 460 and the associated pixels and their relation to dimensions on the scale 110, the included extents of the individual code element sub-zones 551 perpendicular to the measuring axis direction 112, the dimension $d_0$ between the adjacent local datums, and the integrated scale track width 470. Since each code element zone 550 is sized and located along the measuring axis direction 112 as if it were a second incremental scale element 429 of the periodic portion 520, other dimensions of the code element zones 550 and the individual code element sub-zones 551 can be inferred from this information.

Similarly to all previous embodiments, the code elements each code element zone 550 in the integrated scale track 500 according to this invention are arranged and detectable along a respective line extending perpendicular to the expected motion axis. Furthermore, similarly to the previous exemplary embodiment 400', it should be appreciated that in various exemplary embodiments of the integrated scale track 500 the code elements are embedded within and coincide with both the location and extent along the measuring axis direction of periodically placed incremental scale elements. Thus, the 18-bit codes arranged in the code zone 550 allow an absolute range of nearly 84 meters while taking up less than 15% of the integrated scale track 500, along with their adjacent predetermined portion scale elements. Thus, in this exemplary embodiment, at least 85% of the area of the integrated scale track 500 is used for the periodic portion 520, enhancing the speed and accuracy of high-resolution position determinations based on periodic portions according to the principles of this invention, as described above.

It should also be appreciated that confining the code portions 540 and the predetermined pattern portions 530 to the limited span 555 along the measuring axis direction in the periodic portions 520 results in certain signal processing benefits in relation to high accuracy and high speed correlation operations. In particular, the periodic portions 520 of the integrated scale track 500 are uninterruptedly periodic along the measuring axis direction 112 everywhere in each coded segment 510, except where the coded portions 540 and the predetermined portions 530 are embedded in the periodic portion 520 along the measuring axis direction 112 over the span 555. That is, all non-periodic features of the integrated scale track are confined to the span 555. Thus, high accuracy software or hardware correlation operations are easily performed for the periodic portions outside the predictable "stripe" along the measuring axis direction 112 corresponding to the span 555. Accordingly, high accuracy correlation operations that will be free of "non-periodic aberrations" can be performed with a fixed periodic reference image or fixed periodic detector that continuously excludes or nullifies correlation operations in the span 555.

However, it should also be appreciated that since the code elements and predetermined portion scale elements included in the integrated scale track 500 generally only occupy a small proportion of the area of the integrated scale track 500, in various exemplary embodiments periodic portion they are included without special consideration in the periodic portion correlation operations described above and below.

FIG. 9 shows a correlation curve 490 obtained when the reference image includes a representative code portion 440, 540, or the like, in addition to the structure of the first incremental scale elements 426 and second incremental scale elements 429 of the periodic portion 420, 520, or the like. As a result, as the offset between the reference image and the captured image corresponding to the detection window 460 causes the code portion 440, 540, or the like, of the reference image to align with the code portion 440, 540, or the like, of the captured image, the peaks and valleys of the correlation curve 490 reach their maximum amplitude. In contrast, when the offset between the reference and captured images is such that a periodic portion 420, 520, or the like of one of the images aligns with the code portion 440, 540, or the like, of the other image, the amplitude of the peaks and valleys of the correlation curve reaches a minimum. However, the overall periodicity p' between adjacent peaks, or between adjacent valleys, in the correlation curve, corresponding to the incremental pitch p of the periodic portions 420, 520, or the like, remains visible throughout the correlation curve 490 despite the presence of the code portions.

It should be appreciated that the initial estimate of the offset distance dl, according to the operations described above, is certainly accurate to better than one-half of an incremental pitch increment. Accordingly, to refine the absolute position measurement, it is generally only necessary to determine the offset position of any one or more higher amplitude trough or peak, depending on the type of correlation used, relative to its expected offset position for an image where the local datum and/or local datum characteristic 436, 536, or the like, coincides with its reference position.

To generate the correlation curve, in general, for faster signal processing, only a single row, or only a few rows, of the captured image are initially analyzed. In various exemplary embodiments, this is continued during a first portion of the correlation curve analysis, where a crude correlation curve is generated by using only the single row or only the few selected rows of the image to locate the approximate position of at least one peak or trough to be used to refine the position estimate. Generally, this can be any peak or trough having an amplitude indicative of a relatively good correlation, which in some exemplary embodiments may be any peak or trough of the correlation curve.

Once such an appropriate peak or trough is identified, in a second portion of the correlation process, the correlation curve is generated for each of the pixel offset values in the vicinity around that selected peak or trough. This allows the more time-consuming full pixel-by-pixel analysis for all rows of the reference and captured images to be performed, but only for those offset positions in the vicinity of the identified peak or trough that will be used in refining the location of the identified peak or trough to determine the actual offset position. The number of rows of pixels used for during this high-accuracy second portion of the correlation process depends on the desired accuracy. For the highest accuracy, all rows included in the detection window 460 are used.

Once this higher-accuracy correlation curve is generated in the vicinity of the peak or trough, any of the various methods identified in the incorporated 671 application can be used to identify the pixel offset value of the peak or trough to a sub-pixel resolution. The difference between the actual peak or trough offset value and its expected offset value for an image where the local datum coincides with its reference position can be used to refine the resolution and accuracy of the estimated offset distance $d_1$, and the resulting absolute position determination.

For example, in general, the previously-estimated offset distance $d_1$ may in general be broken down into a portion equal to an integer number times the incremental pitch plus or minus an additional amount less than one-half of the incremental pitch. To refine the previously estimated offset distance $d_1$, the additional amount is truncated and replaced with the difference between the actual peak or trough offset value and its expected offset value for an image where the local datum coincides with its reference position.

In various other exemplary embodiments, the second portion of the correlation process can be omitted. In this case, the less accurate or complete correlation curve values can be used to identify the pixel offset value of the peak or trough to the best resolution possible, as outlined in the 671 application, and the accuracy will still be sufficient for a number of useful applications.

Figure 10:
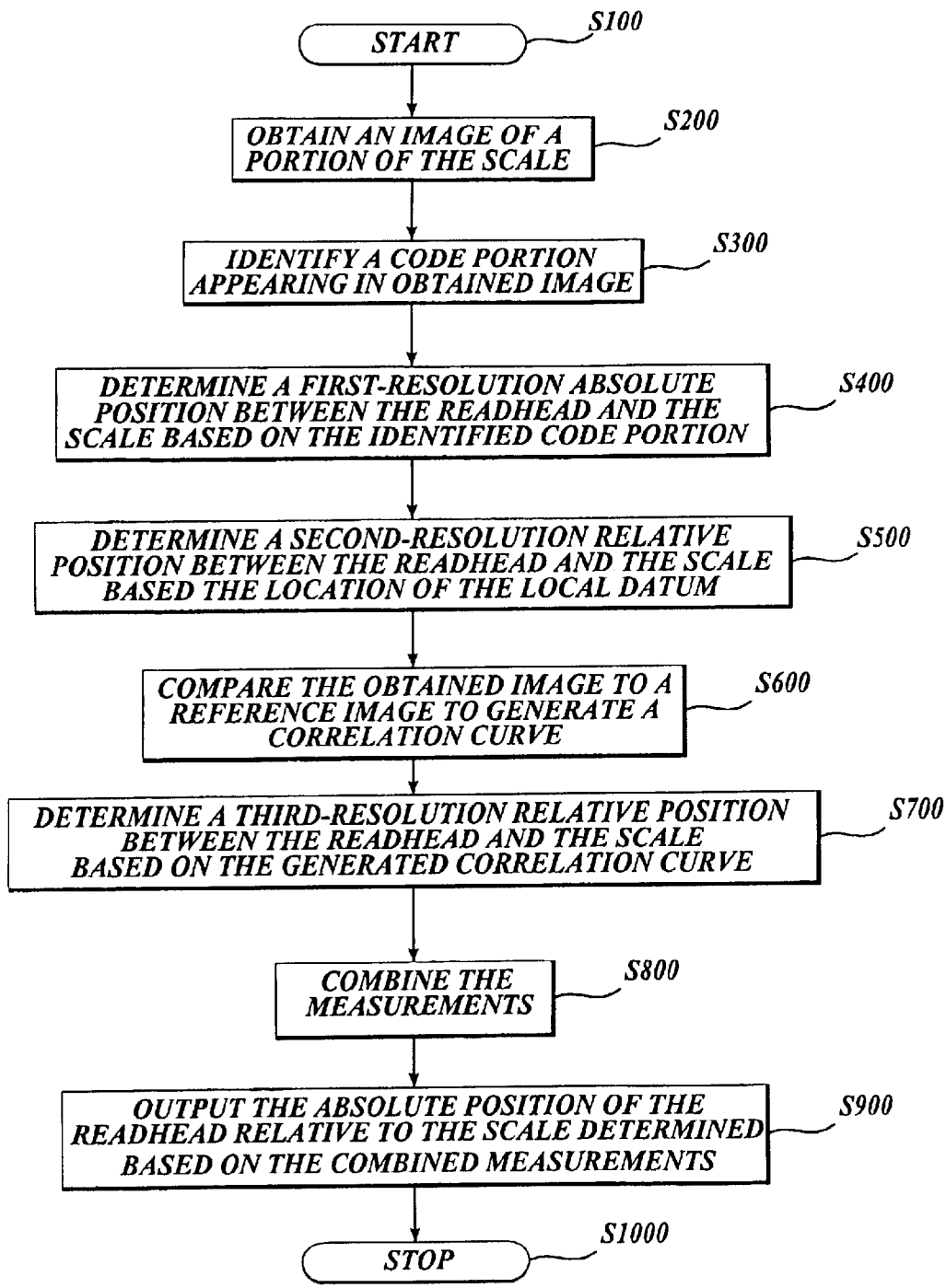
FIG. 10 is a flowchart outlining one exemplary embodiment of a method for determining the absolute position of a readhead relative to an integrated absolute scale including an integrated scale track according to this invention.

FIG. 10 outlines one exemplary embodiment of a method for determining a high-resolution absolute position measurement between a readhead and a scale according to this invention. Beginning in step S100, operation of the method continues to step S200, where an image of a portion of the scale is obtained. Of course, this image of the portion of the scale needs to include at least a portion of one or more periodic portions and one or more code portions or segments of two code portions that can be effectively combined to determine the information included in a complete code portion. Then, in step S300, a code portion that appears in the image of the portion of the scale obtained in step S200 is identified as a code portion. Next, in step S400, a first-resolution absolute position between the readhead and the scale is determined based on the information contained in the identified code portion appearing in the obtained image. Operation then continues to step S500.

In step S500, a second-resolution relative position between the readhead and the scale is determined based on the location of the local datum characteristic associated with the identified code portion appearing in the obtained image. It should be appreciated that, in various exemplary embodiments, the local datum characteristic may appear or occur within a periodic portion of the obtained image that is adjacent to the identified code portion. In contrast, in various other exemplary embodiments, the local datum characteristic appears within the identified code portion.

Next, in step S600, the obtained image is compared to a reference image to generate a correlation curve. It should be appreciated that, in various exemplary embodiments, the reference image is a stored real image, or a stored synthetic image corresponding to the obtained image in a generic way, or an edited stored version of such images. For example, a code portion appearing in an edited stored image could be either devoid of variation, or approximately representative of all of the code portions appearing on the scale, such that the difference between the stored image code portion and each of the actual code portions is reduced as much as possible. In various other exemplary embodiments, a generic reference image could include only features corresponding to a periodic portion, or as previously discussed with reference to the integrated scale track 500 shown in FIG. 8, could include only those portions of the periodic portion that lie outside of an image span that contains the all non-periodic features at all locations along the scale 110. In various other embodiments, the reference or actual image is edited to negate the effects of image smear. As described above with reference to FIG. 6, in various exemplary embodiments the brighter-image type scale elements are synthetically dilated in the reference image or synthetically contracted in the actual image, about their midlines along the measuring axis direction 112, such that the extents of the brighter-image type scale elements approximately match between the reference and actual images. It should be appreciated that any structure for the stored image, or edited stored image, that allows the correlation curve to be generated with sufficient accuracy can be used. In various other exemplary embodiments, an actual image previously obtained from the scale is used as the reference image. Then, in step S700, a third-resolution relative position between the readhead and the scale is determined based on the generated correlation curve. Operation then continues to step S800.

In step S800, the first-, second- and third-resolution relative positions between the readhead and the scale are combined to generate a high-resolution absolute measurement of the relative position between the readhead and the scale corresponding to the obtained image. Then, in step S900, the position of the readhead relative to the scale that is determined based on the combined measurements is output. Operation then continues to step S1000, where operation of the method stops.

Figure 11:
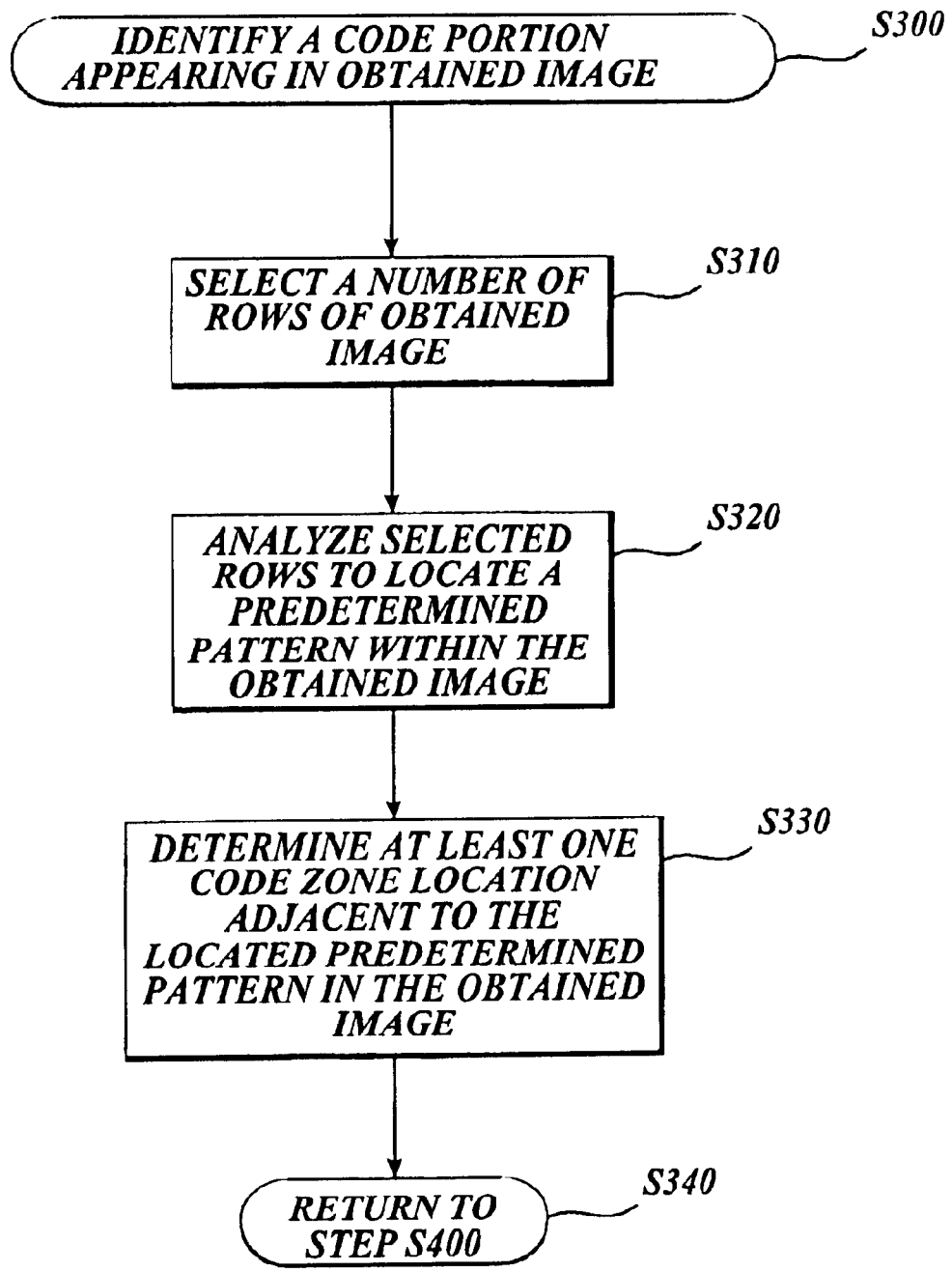
FIG. 11 is a flowchart outlining in greater detail one exemplary embodiment of a method for identifying and/or locating a code portion appearing in an obtained image according to this invention.

FIG. 11 is a flowchart outlining in greater detail one exemplary embodiment of the method for identifying a code portion appearing in the obtained image of step S300. As shown in FIG. 11, operation of the method begins in step S300, and continues to step S310, where a set of one or more rows extending along the measuring axis direction of the obtained image are selected for analysis. Of course, it should be appreciated that the selected set of rows could be all of the rows of the obtained image. Then, in step S320, the selected one or more rows are analyzed to identify a sequence of relatively brighter and darker pixels that are known to correspond to the structure of a readily identifiable predetermined portion of the scale track formed on the scale. Next, in step S330, based on the identified location of the predetermined portion in the set of one or more selected rows of the obtained image, along with a priori knowledge of the position of the code information of the code portion relative to the identified predetermined portion, the image pixels corresponding to the code portion to be used in determining the relative position between the scale and the readhead are identified. Operation then continues to step S340, where operation of the method returns to step S400.

Figure 12:
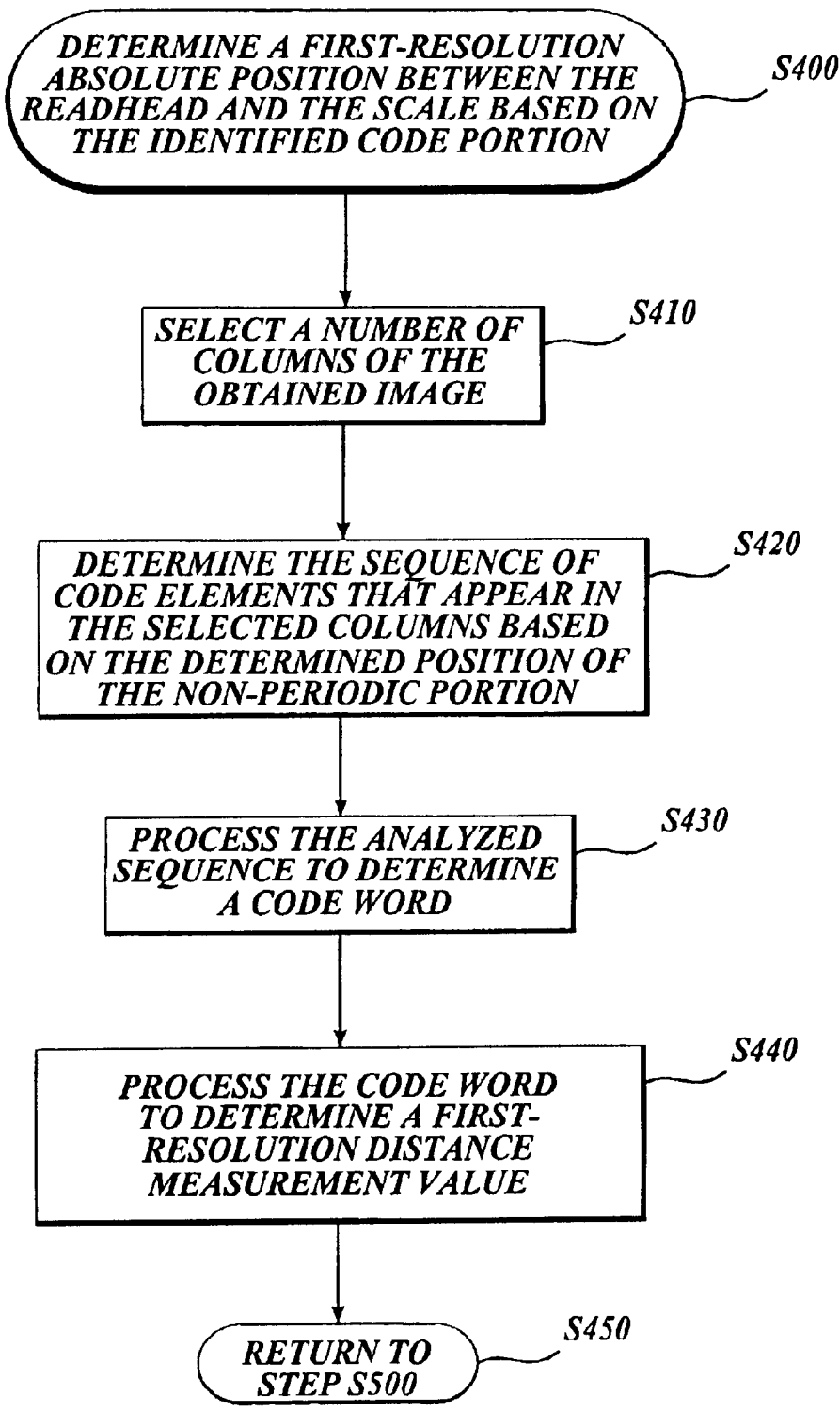
FIG. 12 is a flowchart outlining in greater detail one exemplary embodiment of a method for determining the absolute position of the readhead relative to the integrated absolute scale to a first resolution based on the code portion of the integrated absolute scale according to this invention.

FIG. 12 is a flowchart outlining in greater detail one exemplary embodiment for determining the absolute position of the readhead relative to the scale to the first resolution based on the identified code portion of step S400. As shown in FIG. 12, operation of the method begins in step S400, and continues to step S410, where a number of columns of the obtained image are selected corresponding to the code zones containing the code elements in the obtained image.

Then, in step S420, based on the identified position of the code portion, that is, the identified position of the pixels of the code elements in the one or more selected columns, the sequence of code elements that appear in the selected one or more columns of pixels is analyzed. In general, this comprises analyzing the sequence of the relatively brighter and darker pixels that occur within the selected one or more columns. Next, in step S430, the analyzed sequence of pixels corresponding to the code elements is processed to determine a code word that can be used to determine a measurement value. It should be appreciated that, in various exemplary embodiments, the coded scale markings define a binary code word where the dark pixels correspond to one of the binary values and the light pixels correspond to the other of the binary values. Of course, it should be appreciated that non-binary coding schemes, such as trinary or higher-ordered schemes, can be used. Operation then continues to step S440.

In step S440, the code word is converted into a first resolution distance measurement that indicates, to a first resolution, the portion and/or position of the scale in the obtained image, and thus the position of the scale relative to the readhead. It should be appreciated that, in various exemplary embodiments, the code word is converted into the first resolution distance measurement value using the code word as an input address to a lookup table. The output of the lookup table, based on the address indicated by the code word, indicates the corresponding first resolution distance measurement value. In contrast, in various other exemplary embodiments, the code word defines a number of first resolution periods do between an origin point on the scale and a current position of the readhead relative to the scale. Thus, the first resolution period do is multiplied by the value of the code word or number to obtain the first-resolution distance measurement value. In various other exemplary embodiments, the code word defines a number that is itself the first resolution distance measurement value. Operation then continues to step S450, where operation of the method returns to step S500.

It should be appreciated that, with respect to step S500, the second resolution relative position can be determined by determining the location of a local datum characteristic in the obtained image, relative to a reference position of the local datum characteristic which is implicit in the related signal processing operations. Any of the previously described types of local datum characteristics may be used.

Regardless of what feature or characteristic is used as the local datum characteristic, in various exemplary embodiments, when the reference position for the local datum characteristic is the edge of the obtained image, the distance of the local datum characteristic to the edge of the obtained image is determined by counting the number of pixels between the feature defining the local datum characteristic and the edge of the obtained image. However, it should be appreciated that there is generally expected to be some uncertainty, on the order of a few pixels in the pixel position of the local datum characteristic and thus in the distance $d_1$ between the local datum feature and the edge of the obtained image.

Figure 13:
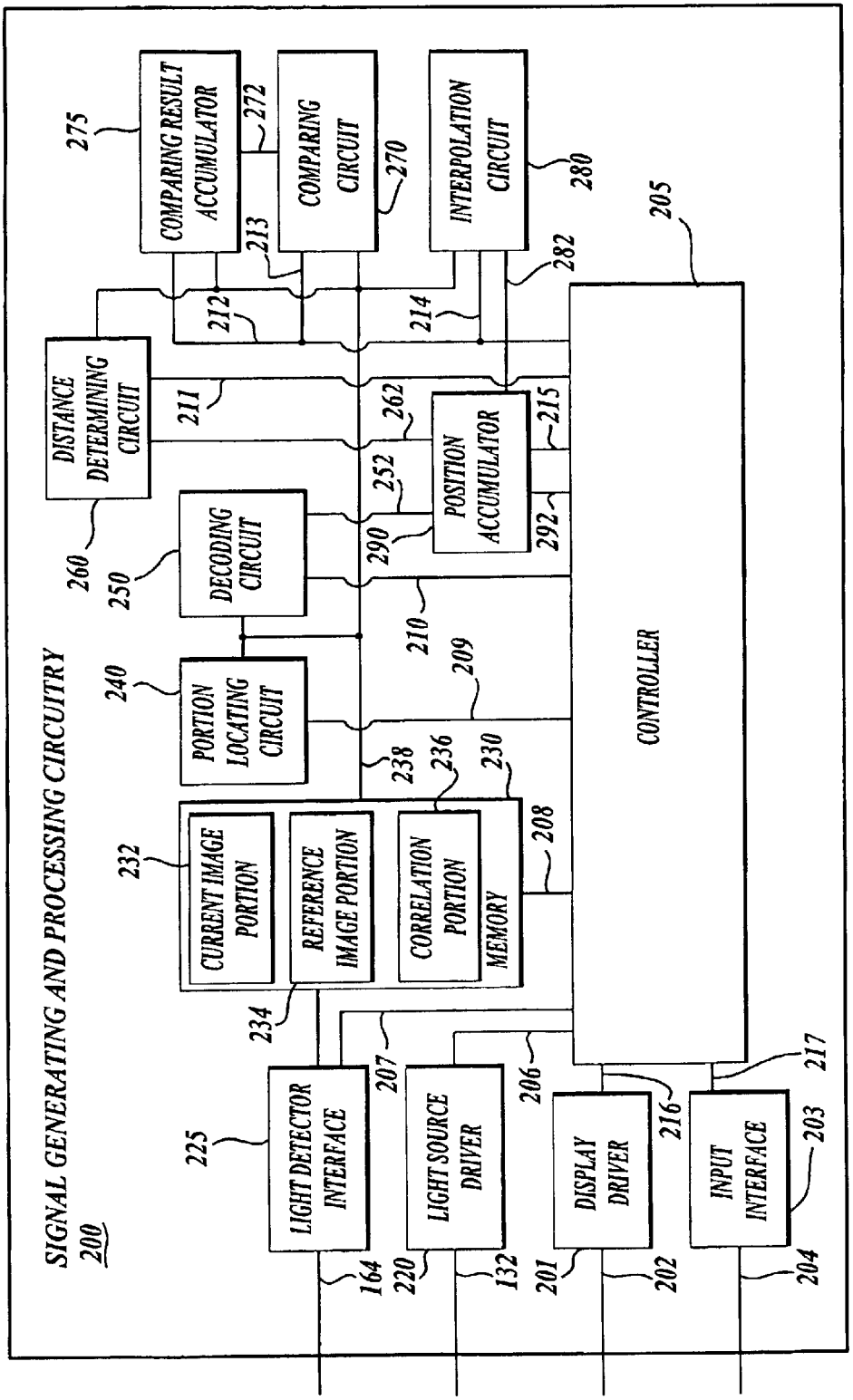
FIG. 13 is a block diagram outlining in greater detail one exemplary embodiment of the signal generating and processing circuitry of FIG. 1 usable to obtain an absolute position measurement from an integrated absolute scale according to this invention.

FIG. 13 is a block diagram outlining in greater detail one exemplary embodiment of the signal generating and processing circuitry 200 shown in FIG. 1. As shown in FIG. 13, the signal generating and processing circuitry 200 includes a controller 205, a light source driver 220, a light detector interface 225, a memory 230, a portion locating circuit 240, a decoding circuit 250, a distance determining circuit 260, a comparing circuit 270, a comparison result accumulation 275, an interpolation circuit 280, a position accumulator 290, a display driver 201 and an optional input interface 203.

The controller 205 is connected to the light source driver 220 by a signal line 206, to the light detector interface 225 by a signal line 207, and to the memory 230 by a signal line 208. Similarly, the controller 205 is connected by signal lines 209–215 to the portion locating circuit 240, the decoding circuit 250, the distance determining circuit 260, the comparing circuit 270, the comparison result accumulator 275, the interpolation circuit 280 and the position accumulator 290, respectively. Finally, the controller 205 is connected to the display driver 201 by a signal line 216 and, if provided, to the input interface 203 by a signal line 217. The memory 230 includes a current image portion 232, a reference image portion 234 and a correlation portion 236.

In operation, the controller 205 outputs a control signal over the signal line 206 to the light source driver 220. In response, the light source driver 220 outputs a drive signal to the light source 130 over the signal line 132.

In various exemplary embodiments, an effective exposure time and duration is initiated and/or stored by operations of the controller 205. The light source driver 220, is operable to strobe the light source to produce an effective image exposure time on the order of 10–200 microseconds, such that smear is sufficiently minimized during high-speed motion.

Subsequently, the controller 205 outputs a control signal to the light detector interface 225 and to the memory 230 over the signal lines 207 and 208 to store the signal portions received over the signal line 164 from the light detector 160 corresponding to each of the image elements 162 into the current image portion 232. In particular, the image values from the individual image elements 162 are stored in a two-dimensional array in the current image portion 232 corresponding to the positions of the individual image elements 162 in the array 166.

After the obtained or current image is stored in the current image portion 232, the current image is output over a signal line 238 to the portion locating circuit 240. Then, based on control signals output from the controller 205 over the signal lines 209, the portion locating circuit 240 analyzes one or more rows of the obtained image stored in the current image portion 232 to locate the predetermined portion 330, or the like, and/or the code portion 340, or the like. Then, based on control signals from the controller 205 over the signal line 210 the decoding circuit 250 inputs, from the current image portion 232 of the memory 230, the code portion, as located by the portion locating circuit 240, that appears within the obtained image.

The decoding circuit 250 then converts the pattern of bright and dark pixels in the located portion of the obtained image into a code word and converts the code word into a first resolution distance measurement value using one of the various techniques outlined above. The decoding circuit 250 outputs this first resolution position measurement value to the position accumulator 290 over a signal line 252.

Next, based on the predetermined portion or code portion located by the portion locating circuit 240, the controller 205 outputs control signals over the signal line 211 to the distance determining circuit 260. In response, the distance determining circuit 260 inputs the all or part of the obtained image including at least the reference location for the local datum characteristic, such as one of the edges of the obtained image and the portion of the obtained image which is required in order to determine the location of the local datum characteristic from the current image portion 232 of the memory 230. The distance determining circuit 260 then analyzes this input portion of the obtained image to determine the second resolution distance measurement value for the relative position of the readhead relative to the scale based on the distance of the local datum characteristic to the reference position for the local datum characteristic. The distance determining circuit 260 outputs this second resolution distance measurement value over a signal line 262 to the position accumulator 290.

Then, the controller 205 outputs a signal on the signal line 213 to the comparing circuit 270. In response, the comparing circuit 270 inputs an image value for a particular pixel from the selected portion of the current image stored in the current image portion 232 over the signal line 238 and inputs the image value for the corresponding pixel, based on the current offset, from the reference image portion 234 over the signal line 238. The comparing circuit 270 then applies a correlation algorithm to determine a comparison result. Any appropriate correlation technique, known or later-developed, can be used by the comparing circuit 270 to compare the current image stored in the current image portion 232 with the reference image stored in the reference image portion 234 on a pixel-by-pixel basis based on the current offset. The comparing circuit 270 outputs the comparison result on a signal line 272 to the comparison result accumulator 275 for the current correlation offset.

Once the comparing circuit 270 has extracted and compared the image value for each of the image elements 162 from the current image portion 232 and compared them to the corresponding image value stored in the reference image portion 234, and applied the correlation technique and output the comparison result to the comparison result accumulator 275, the value stored in the comparison result accumulator 275 defines the correlation value, corresponding to the current offset, in predetermined units, as exemplified in FIG. 9. The controller 205 then outputs a signal over the signal line 212 to the comparison result accumulator 275 and to the memory 230 over the signal line 208. As a result, the correlation value result stored in the comparison result accumulator 275 is output and stored in the correlation portion 236 of the memory 230 at a location corresponding to the current offset.

The controller 205 then outputs a signal on the signal line 213 to clear the result accumulator 275. Once all of the comparisons for all of the desired offsets between the current image stored in the current image portion 232 and the reference image stored in the reference image portion 234 have been performed by the comparing circuit 270, and the results accumulated by the comparison result accumulator 275 and stored in the correlation portion 236 under control of the controller 205, the controller 205 outputs a control signal over the signal line 214 to the interpolation circuit 280.

The stored correlation curve stored in the correlation portion 236 of the memory 230 is then output, under control of the controller 205, to the interpolation circuit 280. That is, the interpolation circuit 280 inputs the correlation results stored in the correlation portion 236 over the signal line 238, and identifies correlation values coinciding with a peak or trough of the correlation function and interpolates using selected correlation function value points in the vicinity of the peak/trough of the correlation function to determine the peak offset value or image displacement value with sub-pixel resolution. The interpolation circuit 280 then outputs, under control of the signal over the signal line 214 from the controller 205, the determined subpixel third resolution measurement value on a signal line 282 to the position accumulator 290.

The interpolation circuit 280 first identifies a selected peak or trough of the correlation function to be used to identify the third resolution distance measurement value of the absolute position between the readhead and the scale. In various exemplary embodiments, where the initial correlation function is to be used by the interpolation circuit 280, the interpolation circuit 280 uses any known or later developed technique, such as any one of the techniques disclosed in the incorporated '671 patent to find the actual location of the selected peak of the correlation function to a subpixel resolution. This subpixel resolution distance is output by the interpolation circuit 280 over the signal line 282 to the position accumulator 290.

In contrast, in various other exemplary embodiments, once the interpolation circuit 280 has identified the selected peak or trough, the comparing circuit 270 and the comparison result accumulator 275 perform a full pixel-by-pixel comparison for the entire obtained and referenced images to generate a high-accuracy correlation curve, but only for the areas immediately surrounding the selected correlation curve peak or trough selected by the interpolation circuit 280. This additional correlation curve is also stored in the correlation portion 236. Then, under control of the controller 205, the interpolation circuit 280 inputs this second correlation curve and using any known or later developed interpolation technique, interpolates between the values of the correlation curve to identify the actual peak or trough offset of the selected peak or trough to the third resolution. Again, this third resolution distance measurement is output over the signal line 282 to the position accumulator 290.

The position accumulator 290 combines the distance measurement values output by each of the decoding circuit 250, the distance determining circuit 260 and interpolation circuit 280 to generate a high-resolution absolute position measurement indicative of the position of the readhead relative to the scale. The position accumulator 290 outputs this absolute position measurement to the controller 205 over the signal line 292. The controller 205 then outputs the determined absolute position measurement over a signal line 216 to a display driver 201. The display driver 201 drives a display (not shown) by outputting control signals over a signal line 202 to output the determined absolute position measurement.

One or more signal lines 204, if provided, allow an interface between an operator or a cooperating system and the controller 205. If provided, the input interface 203 may buffer or transform the input signals or commands and transmit the appropriate signal to the controller 205. In various exemplary embodiments, an operator or a host system can transmit a position request signal to the controller 205. In response, the controller 205 initiates a current absolute position determination and/or outputs the current absolute position measurement to the display driver 201, which then outputs drive signals over the signal line 202 to the display device 107 to update the display with the current absolute position determination.

It should be appreciated that the foregoing discussion emphasizes scales 110 where each of the code portions 340, 340', or the like have a characteristic extents along the measuring axis direction 112 and perpendicular to the measuring axis direction 112, and each of the periodic portions 340 have a characteristic extent along the measuring axis direction 112. However, in various other embodiments, these extents may vary within one or more respective coded segments 310, or the like, and furthermore the extents of various respective coded segments 310, or the like, may vary along the scale 110. Nevertheless, in such cases, the code elements of each code portion must still be indicative of a measurement value of a local datum, even though the local datums will not necessarily occur periodically along the scale.

It should also be appreciated that, in various applications, it is advantageous to combine an integrated scale track according to this invention and associated position detection methods with other types of scale tracks and their associated position detection methods. For example, incremental measurement systems using incremental scales having a very fine pitch on the order of a few micrometers or less are known to produce resolution and accuracy on the order of nanometers. It should also be appreciated that, when an integrated scale track and system according to this invention is appropriately combined with such a fine pitch incremental system, the integrated scale track and system can provide an absolute measurement accurate to within one particular period of the fine pitch incremental system.

The results of the two systems may therefore be combined to produce a combined absolute measurement system having the resolution and accuracy of the incorporated fine pitch incremental system. It should be further appreciated that, in such a combined scale track system with a fine pitch incremental scale track, the particular combination of high speed signal processing attributes, robustness for misalignments, resolution vs. range advantages and width advantages provided by this invention are of great utility.

It should also be appreciated that while various exemplary embodiments of the invention have been illustrated and described, a wide variety of alternative codes and detection schemes may be used for the code portions, and/or the predetermined portions. Furthermore, a wide variety of alternative hardware and software schemes are applicable to detect the location of the periodic portions relative to the readhead to provide the third-resolution measurement value according to the principles of this invention. Thus, it should be appreciated that these and other various changes can be made to the various exemplary embodiments of the invention that have been illustrated and described herein without departing from the spirit and scope of the invention.

The embodiments of the invention in which an exclusive property or privilege is claimed are defined as follows:

1. An absolute position sensing device usable to measure a relative position between two elements, the absolute position sensing device including a readhead and a scale, the scale including an integrated scale track extending along a measuring axis, the integrated scale track comprising a plurality of coded segments within the integrated scale track along the measuring axis, each coded segment comprising a periodic portion and a code portion, the periodic portion comprising:
  a plurality of strip-like first incremental scale elements interleaved with a plurality of strip-like second incremental scale elements along the measuring axis direction, a narrow dimension of the strip-like first and second incremental scale elements extending along the measuring axis direction, at least some of the strip-like first and second incremental scale elements extending to a first edge of the integrated scale track along a direction perpendicular to the measuring axis direction and at least some of the strip-like first and second incremental scale elements extending to an opposite edge of the integrated scale track along the direction perpendicular to the measuring axis direction, wherein the strip-like first incremental scale elements and the strip-like second incremental scale elements are positioned to alternate periodically along the measuring axis direction according to a pitch dimension P, and the code portion comprising:
  a plurality of code elements defining a code word that is usable to identify a measurement value of a local datum along the measuring axis, the plurality of code elements comprising at least one respective set of respective code elements arranged along the direction perpendicular to the measuring axis direction within a respective code element zone, the respective code element zone located along the measuring axis and extending along the direction perpendicular to the measuring axis direction over at least a part of the width of the integrated scale track, each respective code element having a respective nominal code element dimension along the direction perpendicular to the measuring axis direction that corresponds to respective nominal code element boundaries that extend parallel to the measuring axis direction, wherein:
the plurality of first incremental scale elements, the plurality of second incremental scale elements and the plurality of code elements are configured such that a detection window of the readhead includes a number of code elements sufficient to define a code word usable to identify an absolute measurement value of a local datum included in the detection window and at least 50% of a total area of the detection window includes the first incremental scale elements and the second incremental scale elements of at least one periodic portion, regardless of the position of the detection window along the measuring axis of the scale.

2. The absolute position sensing device of claim 1, wherein a total length along the measuring axis direction of the code portion is less than a total length along the measuring axis direction of the periodic portion.

3. The absolute position sensing device of claim 2, wherein the code portion is embedded within the periodic portion.

4. The absolute position sensing device of claim 3, wherein at least one respective code element zone is arranged such that its location and extent along the measuring axis direction coincides with a location and extent along the measuring axis direction that is otherwise usable for one of the first incremental scale elements and the second incremental scale elements positioned to alternate periodically along the measuring axis direction according to the pitch dimension P.

5. The absolute position sensing device of claim 2, wherein a total length along the measuring axis direction of the code portion is at most three times the pitch dimension P.

6. The absolute position sensing device of claim 1, wherein the at least one respective set of respective code elements arranged along the direction perpendicular to the measuring axis direction within a respective code element zone comprises at least 3 code elements.

7. The absolute position sensing device of claim 1, wherein the at least one respective set of respective code elements arranged along the direction perpendicular to the measuring axis direction within a respective code element zone comprises all the code elements that define the code word in that code portion.

8. The absolute position sensing device of claim 1, wherein the first incremental scale elements are darker-image type scale elements, the second incremental scale elements are brighter-image type scale elements, and the second incremental scale elements have a dimension along the measuring axis direction which is at most equal to the corresponding dimension of the first incremental scale elements.

9. The absolute position sensing device of claim 8, wherein the respective nominal code element dimension of at least some of the code elements along the direction perpendicular to the measuring axis direction is at most equal to the dimension along the measuring axis direction of the second incremental scale elements.

10. The absolute position sensing device of claim 8, wherein
the readhead comprises a plurality of imaging elements arranged periodically at a pixel pitch $p_{row}$ in a plurality of rows along a row direction corresponding to the measuring axis direction and periodically at a pixel pitch $p_{column}$ in a plurality of columns along a column direction perpendicular to the row direction;
the extents of the detection window of the readhead correspond to the extents of a projected image of the scale received by the plurality of imaging elements when the readhead is operably positioned relative to the scale; and
a readhead magnification M of the projected image of the scale is such that M times the dimension along the measuring axis direction of the second incremental scale elements is at least equal to $3p_{row}$ and M times the dimension along the measuring axis direction of the second incremental scale elements is at least equal to $3p_{column}$.

11. The absolute position sensing device of claim 1, wherein at least 75% of the total area of the detection window includes the first incremental scale elements and the second incremental scale elements of at least one periodic portion, regardless of the position of the detection window along the measuring axis of the scale.

12. The absolute position sensing device of claim 1, wherein for each of at least a sub-plurality of adjacent coded segments, the first incremental scale elements and second incremental scale elements positioned to alternate periodically along the measuring axis direction according to a pitch dimension P are positioned according to an underlying periodic placement pattern that has the pitch dimension P and that is continuously periodic along the measuring axis throughout at least the sub-plurality of adjacent coded segments.

13. The absolute position sensing device of claim 1, wherein each coded segment further comprises a predetermined portion, the predetermined portion comprising a scale element pattern that is the same for each of the coded portions.

14. The absolute position sensing device of claim 1, further comprising a signal processing unit, wherein when an operably positioned readhead detects an image of the scale in the detection window, the signal processing unit is usable to:
identify the measurement value of the local datum included in the detection window based on the number of code elements included in the detection window that are sufficient to define the code word;
determine a measurement value of an offset of the readhead relative to the local datum based at least partly on the first incremental scale elements and the second incremental scale elements included in the detection window, and
combine the measurement value of the local datum and the measurement value of the offset of the readhead relative to the local datum to determine a position measurement.

15. An absolute position sensing device usable to measure a relative position between two elements, the absolute position sensing device including a readhead and a scale, the scale including an integrated scale track extending along a measuring axis, the integrated scale track comprising a plurality of coded segments within the integrated scale track along the measuring axis, each coded segment comprising a periodic portion and a code portion embedded within the periodic portion,
the periodic portion comprising:
a plurality of strip-like first incremental scale elements interleaved with a plurality of strip-like second incremental scale elements along the measuring axis direction, a narrow dimension of the strip-like first and second incremental scale elements extending along the measuring axis direction, the strip-like first and second incremental scale elements nominally extending a full width of the integrated scale track along a direction perpendicular to the measuring axis direction except where the code portion is embedded, wherein the strip-like first incremental scale elements and the strip-like second incremental scale elements are positioned to alternate periodically along the measuring axis direction according to an underlying periodic placement pattern that has the pitch dimension P and that is continuously periodic along the measuring axis throughout the plurality of coded segments, and
the code portion comprising:

a plurality of code elements defining a code word that is usable to identify a measurement value of a local datum along the measuring axis, the plurality of code elements comprising at least one respective set of respective code elements arranged along the direction perpendicular to the measuring axis direction within a respective code element zone, the respective code element zone located along the measuring axis and extending along the direction perpendicular to the measuring axis direction over a part of the width of the integrated scale track that does not include either edge of the integrated scale track, each respective code element having a respective nominal code element dimension along the direction perpendicular to the measuring axis direction that corresponds to respective nominal code element boundaries that extend parallel to the measuring axis direction, wherein:

the plurality of first incremental scale elements, the plurality of second incremental scale elements and the plurality of code elements are configured such that a detection window of the readhead includes a number of code elements sufficient to define a code word usable to identify an absolute measurement value of a local datum included in the detection window, and at least 50% of a total area of the detection window includes the first incremental scale elements and the second incremental scale elements of at least one periodic portion, regardless of the position of the detection window along the measuring axis.

16. The absolute position sensing device of claim 15, wherein the periodic portion nominally fills the coded segment except where at least one of the code portion and a predetermined portion is embedded.

17. A method for determining a high resolution position of a detector array along an absolute scale, wherein the absolute scale includes an integrated scale track extending along a measuring axis, the integrated scale track comprising a plurality of coded segments comprising a periodic portion and a code portion, the periodic portion comprising:
a plurality of strip-like first incremental scale elements interleaved with a plurality of strip-like second incremental scale elements along the measuring axis direction, a narrow dimension of the strip-like first and second incremental scale elements extending along the measuring axis direction, at least some of the strip-like first and second incremental scale elements extending to a first edge of the integrated scale track along a direction perpendicular to the measuring axis direction and at least some of the strip-like first and second incremental scale elements extending to an opposite edge of the integrated scale track along a direction perpendicular to the measuring axis direction, wherein the strip-like first incremental scale elements and the strip-like second incremental scale elements are positioned to alternate periodically along the measuring axis direction according to a pitch dimension P, and the code portion comprising:
a plurality of code elements defining a code word that is usable to identify a measurement value of a local datum along the measuring axis, the plurality of code elements comprising at least one respective set of respective code elements arranged along the direction perpendicular to the measuring axis direction within a respective code element zone, the respective code element zone located along the measuring axis and extending along the direction perpendicular to the measuring axis direction over at least a part of the width of the integrated scale track, each respective code element having a respective nominal code element dimension along the direction perpendicular to the measuring axis direction that corresponds to respective nominal code element boundaries that extend parallel to the measuring axis direction, the method comprising:
detecting an image of a portion of the integrated scale track corresponding to a current position using the detector array;
determining a measurement value of a local datum based on at least one code portion included in the detected image;
determining a measurement value of an offset of the detector array relative to the local datum based at least partly on a plurality of incremental scale elements included in the detected image; and
combining the measurement value of the local datum point and the measurement value of the offset of the detector array relative to the local datum to determine the high resolution position of the detector array along the absolute scale.

18. The method of claim 17, wherein:

each coded segment includes a predetermined portion; and determining the measurement value of the local datum based on at least one code portion included in the detected image comprises:
determining a location of at least one predetermined portion included in the detected image;
determining a location of the code elements in the detected image based on the determined location of the predetermined portion;
processing the detected image corresponding to the location of the code elements to determine code element values of the code elements appearing in the detected image; and
determining the measurement value of the local datum based on the determined code element values.

19. The method of claim 17, wherein the detector array comprises a plurality of columns extending along a direction corresponding to the direction perpendicular to the measuring axis direction, each column comprising a plurality of detector elements, and wherein determining the measurement value of a local datum based on at least one code portion included in the detected image comprises:
processing the detected image to determine the location of at least one respective code element zone included in the detected image;
processing the detected image along at least one column of detector elements in the at least one respective code element zone to determine the code element values of the code elements included in the at least one respective code element zone; and
determining the measurement value of the local datum based on the code element values of the code elements included in the at least one respective code element zone.

20. The method of claim 17, wherein:

the detector array comprises a plurality of detector elements extending in a plurality of rows along a direction corresponding to the measuring axis direction, each row comprising a plurality of detector elements spaced apart according to a detector element row pitch; and determining the measurement value of the offset of the detector array relative to the local datum comprises:

estimating an offset of a local datum characteristic relative to the detector array to a resolution that is finer in the detected image than a distance corresponding to one half of the underlying incremental pitch in the detected image, estimating an offset of a plurality of incremental scale elements relative to the detector array to a resolution that is at least as fine in the detected image as the detector element row pitch, and determining the measurement value of the offset of the detector array relative to the local datum based at least partly on the estimate of the offset of the local datum characteristic relative to the detector array and at least partly on the estimate of the offset of the plurality of incremental scale elements relative to the detector array.

* * * * *